(12) United States Patent
Goodberlet et al.

(10) Patent No.: US 7,117,724 B1
(45) Date of Patent: Oct. 10, 2006

(54) FLEXURE-BEAM ACTUATOR AND STAGE FOR MICRO- AND NANO-POSITIONING

(75) Inventors: James Gregory Goodberlet, Melrose, MA (US); Alphonse George Goodberlet, Blue Hill, ME (US)

(73) Assignee: James G. Goodberlet, Melrose, MA (US)

( * ) Notice: Subject to any disclaimer, the term of this patent is extended or adjusted under 35 U.S.C. 154(b) by 76 days.

(21) Appl. No.: 10/819,722

(22) Filed: Apr. 7, 2004

(51) Int. Cl.
 *G05G 1/00* (2006.01)
(52) U.S. Cl. .......................................... 73/105; 74/470
(58) Field of Classification Search .............. 73/866.5, 73/105, 782; 74/89, 96, 97.2, 99 R, 100.2, 74/110, 470; 108/137–143, 20
See application file for complete search history.

(56) References Cited

U.S. PATENT DOCUMENTS

| | | | | |
|---|---|---|---|---|
| 3,731,548 A | * | 5/1973 | Bocksruker | 74/96 |
| 4,209,233 A | | 6/1980 | Eisler | |
| 4,872,361 A | * | 10/1989 | Muller | 74/473.29 |
| 4,896,556 A | * | 1/1990 | Takada | 74/523 |
| 5,233,884 A | * | 8/1993 | Rochte | 74/581 |
| 5,865,266 A | * | 2/1999 | Froelich et al. | 180/443 |
| 5,969,892 A | | 10/1999 | Slusher | |
| 6,192,771 B1 | * | 2/2001 | Gouselis | 74/473.34 |

OTHER PUBLICATIONS

J. G. Goodberlet and Bryan L. Dunn, Microelectronic Eng., vol. 53, p. 95 (2000), p. 98, c. 1+2 FIG. 3.
T. Bailey, et al, Journal of Vacuum Science and Technology B, vol. 18, p. 3572 (Dec. 2000), p. 3576, c. 1 I.3-14.
Martin L. Culpepper and Gordon Anderson, "Design of a low-cost nano-manipulator which utilizes a monolithic, spatial compliant mechanism", submitted to the Journal of Precision Engineering, also available at http://www.mit.edu, no date, p. 3, FIG. 3; p. 4, FIG. 4; p. 6, FIG. 6.

* cited by examiner

Primary Examiner—Robert Raevis

(57) ABSTRACT

This invention enables high-resolution, high-precision motion control at low cost. A novel flexure-beam motion-reducing actuator is incorporated into an XYØ positioning stage to enable rigidly stable positioning of any object with sub-10-nanometer linear-positioning precision and sub-0.1-microradian rotary-positioning precision. The actuator's output element moves in the same direction as its input element. A single actuator enhances the resolution and precision of any motion-control drive mechanism by a factor as much as 50 or more, and a cascaded pair of actuators provide enhancement factors greater than 1000. In one embodiment, the enhancement factor is adjustable manually. The actuator and stage are useful for optical, lithographic and scanning probe applications.

22 Claims, 13 Drawing Sheets

FLEXURE-BEAM ACTUATOR AND STAGE FOR MICRO- AND NANO-POSITIONING

BACKGROUND OF THE INVENTION

This invention arose from the need to achieve rigidly-stable positioning of objects with 10 nanometer resolution and precision at low cost. In particular, an XYØ positioning stage that meets these criteria was required for precise mask-to-substrate alignment in a low-cost, submicron contact-lithography apparatus. [J. G. Goodberlet and Bryan L. Dunn, *Microelectronic Eng.*, Vol. 53, p. 95 (2000).] In most contact lithography instruments, including those used for nano-imprint lithography [S. Y. Chou, et al, *Applied Physics Letters*, Vol. 67, p. 3114 (1995).] and step-and-flash lithography [T. Bailey, et al, *Journal of Vacuum Science and Technology B*, Vol. 18, p. 3572 (2000)], significant forces and loads can act upon the stage after precise alignment has been achieved, thereby necessitating a need for a rigidly-stable platform. Although there exist several types of stages and positioning instruments, available commercially and under development, none exhibit the combined features of stability, high resolution, high precision and low cost required for this lithographic application. Positioning stages which achieve the resolution and precision requirements are prohibitively expensive because of their sophisticated mechanical and electronic components. Therefore, a need exists for an apparatus which demonstrates rigidly-stable positioning with 10-nm-level resolution and precision, and can be manufactured at low cost. In order to achieve this objective, it was necessary to innovate both a high-precision actuating element, which could be incorporated into the positioning stage, and a suitable stage design.

DESCRIPTION OF THE PRIOR ART

For clarification, terms frequently used in this application are defined as follows:

accuracy: This term pertains to the overall calibration of a positioning instrument, or the absolute location which can be achieved with respect to a perfect standard. As an example, a one-foot ruler may have been manufactured slightly incorrectly such that its true length, with respect to a perfect standard, is one foot and one-sixteenth inch. The accuracy of the ruler is therefore in error.

actuator: The component of a positioning instrument responsible for the controlled and precise motion of a movable platform or an object under study.

drive mechanism: A component of an actuator which initiates movement in a positioning instrument.

OUS: Object Under Study. This is any object for which high-resolution and high-precision positioning is desired.

output element: This component of an actuator is coupled or linked to a movable platform or any object under study, and transmits motion from the actuator to the platform or OUS.

precision: The degree of exactness to which the actuator's output element can be returned to a desired location from any setting. Following the example of a ruler, precision would represent how tightly clustered a set of measurements would be when made with a ruler used in different manners, i.e. measuring a six-inch distance from the 0 to 6 markings, from the 2 to 8 markings, from the 9 to 3 markings, etc.

resolution: The amount of distance moved per smallest calibrated marking on the drive mechanism. Following the example of a ruler, resolution would correspond to the finest divisional marking on a ruler—$\frac{1}{16}$ inch.

Generally speaking, positioning stages are comprised of an actuator and a stage, wherein the stage has a moveable platform. The available actuators can be classified into three groups: (1$a$) manual mechanical actuators, (2$a$) active electro-actuators, and (3$a$) motion-reducing flexure actuators. The available stages can also be classified into three groups: (1$s$) bearing stages, (2$s$) flexure stages, and (3$s$) non-bearing stages. Each of these stage types has several design variations, too numerous to include in the descriptions below. An excellent reference for stage designs is *Precision Machine Design* by A. H. Slocum, Prentice-Hall, Inc., Englewood Cliffs, N.J., 1992.

FIG. 1 depicts a section view of a manual mechanical actuator, called a differential micrometer, which is available commercially at low cost. The actuator achieves good resolution using two fine-pitched threads, set 112 and set 114, which have slightly different pitch. As the drive mechanism 100, a thimble, rotates clockwise, it advances into a rigidly held outer sleeve 120, but its spinning action also causes the inner threaded shaft 130 to retract. A sliding pin 132 prevents the inner shaft from spinning. The net advancement of the output element 130, with respect to the outer sleeve 120 is proportional to the difference between the pitches of thread sets 112 and 114. When used with a positioning stage, the output element contacts directly to the stage's moveable body. For user convenience, thimble 100 has fine calibrated marks equally distributed around its cylindrical body.

Due to manufacturing limitations for fine-threaded shafts and durability issues, the best resolution available for differential micrometers is about 500 nm. This would correspond to one mark on thimble 100. The actuator's precision is degraded by several causes. Loose thread sets 112 and 114 cause backlash and a slight wobbling of the output element. Additionally, the sliding pin can stick and slip as it is moves. Dirt or grease within the threads causes unpredictable positioning of the shaft and thimble at the sub-100-nm level. Because of its direct coupling to a stage's moveable body, any undesirable perturbation to the thimble transfers directly to the OUS. The simple act of touching the thimble can introduce micron-size errors. This actuator cannot meet the requirements for precise 10-nm-level positioning.

FIG. 2 is a plan view depicting a motion-reducing actuating element that is disclosed in U.S. Pat. No. 4,209,233. The essence of this invention is that a flexure rod 210 pushes on a rigid L-shaped lever 234 which rotates via leaf springs 232 causing motion of the output element 230. A useful feature of this invention is that the motion of the output element is reduced, by the length ratio of the lever arms, as compared to the motion of the input element 210. An undesirable feature of this device is that the motion of the output element 230 is not exactly in the desired direction 140. Rather, it moves along a circular arc. The inventor compensates for this with a second, upper mechanical lever-arm mechanism, and reports that a motion-reduction ratio of 1/10 can be achieved. The resulting instrument is complicated, has many parts and is difficult to manufacture. Very low reduction ratios, R, cannot be achieved in a compact instrument because R is proportional to L1/L2 where L1 is the length of the short lever arm and L2 is the length of the long lever arm.

This motion-reducing actuator's precision suffers from unpredictable mechanical motion and sliding action on the upper lever arm, not shown, at its pivot point and where the drive element's shaft contacts the lever arm. An irregularity of only 2 microns in the shaft's sliding action across the upper lever arm as it pivots, would lead to a positioning error of 200 nm for the OUS when R=1/10. An irregularity at the pivot point in the upper lever arm would be transferred directly to the lower lever arm 234 and not receive the full reduction ratio of the combined levers. Due to its precision limitations and mechanical complexity, this motion-reducing actuator and stage are not suitable for low-cost, 10-nm-level positioning.

A more recent invention, disclosed in U.S. Pat. No. 5,969,892, employs motion-reducing flexure elements to achieve high-precision positioning. The essence of this invention is depicted in the elevation view of FIG. 3. Its operation is similar to that of a scissor jack. A rigidly held lower plate 320 is attached to a top plate 330 with two identical flexure trusses 310. An internal drive mechanism 300 spreads the side-wall trusses 310 by thrusting the input elements 301 and 302 outward. The resulting deformation of the trusses moves the output element 330 in the desired direction 140.

There are several deficiencies with this invention. Any perturbation of the drive mechanism 300 in the direction 140 couples directly to the output element, and any net movement of the drive mechanism 300 in a transverse direction results in amplified transverse motion at the output element. The exact relation between the magnitude of movement of the output element 330 and the magnitude of movement of the input element (301 and 302) is not immediately obvious. Further, the amount of movement in the direction 140 is not linearly related to the amount of spreading of the side walls, because of trigonometric considerations, as is true of scissor jacks. This results in a varying motion-reduction ratio over the instrument's range of motion. Numerical analysis is required to determine this instrument's reduction ratio, as a function of position, for a particular design, and expensive sensing electronics would be required to determine the precise location of the output element. A practical deficiency is that it requires a special drive mechanism, one which can be incorporated inside the device. A commercially available micrometer, such as that shown in FIG. 1, cannot be readily adapted to this instrument. Another shortcoming is that the device is susceptible to thermal-expansion errors. This invention is not suitable for low-cost, 10-nm precision positioning.

An example of a commercially-available, state of the art drive active electro-actuator for nano-positioning is depicted in the plan view FIG. 4. Typically, a piezoelectric (PZT) stack 400, rigidly attached to an immovable plate 420, pushes on an output element 430, which may be the moveable platform of a positioning stage. A high-precision transducer 460 senses the position of the output element and feeds any necessary position-correction signal to the input element 400 until the desired position is attained. The transducer is required because of hysteretic behavior natural to PZT stacks. Although these instruments readily achieve sub-2-nm positioning precision, their cost is high because of the associated drive electronics necessary to implement a position-correcting feedback loop. The piezoelectric stack and precision transducer also contribute a significant portion of the cost. This instrument does not satisfy the low-cost requirement for sub-10-nm positioning.

An invention recently disclosed, termed HexFlex, shows that sub-10-nm positioning can be achieved with motion-reducing flexure actuators. ["Design of a low-cost nano-manipulator which utilizes a monolithic, spatial compliant mechanism", Martin L. Culpepper and Gordon Anderson, submitted to the *Journal of Precision Engineering*, also available online at http://www.mit.edu.] The flexure-actuating element for this invention is depicted in the plan view of FIG. 5. An output element 530 and two rigidly mounted pads 520 are connected to an input element 500 via three flexure bars 510. A displacement 542 of the input element 500 causes reduced motion at the output element 530 in the desired direction 140. For this invention, three identical actuators are equispaced around the perimeter of a circle and the output elements are directly coupled to a central movable platform. The central platform is therefore suspended by the three actuators. A desirable feature of this invention is that displacements of the input elements 500, both in plane and out of plane, permit six-axis motion of the central platform.

This disclosed invention does have several shortcomings that preclude its use as a low-cost 10-nm positioning instrument. Because of its design, the instrument requires multiple simultaneous drive at the input elements to achieve XYØ motion. For example, to achieve single-axis (X) motion, two actuators must be driven simultaneously. To achieve motion along an orthogonal axis (Y), three actuators must be driven simultaneously. To achieve rotation (Ø), three actuators must be driven simultaneously. Coordinated drive electronics would then be necessary to achieve the desired motion. By design, the invention comprises a taught membrane, which is susceptible to vibrations, particularly at its resonant frequency. There is no means for stabilizing the suspended central platform. The motion reduction (or transmission ratio) of the actuators depends upon several design parameters and equations, as disclosed by Culpepper. Extensive numerical analysis is required for the design of the stage and actuators. There is no simple means for post-manufacture adjustment, by the user or at the factory, of the motion-reduction ratio, and no apparent means for cascading the actuators to achieve motion-reduction and precision performance. For this instrument, drive mechanisms for the input elements 500 must be incorporated inside the framework of the stage, which may restrict use of many commercially-available drive elements. Also, the motion of the input element 500 is not exactly in the desired direction of motion 140. This is inconvenient for manual operation of the stage. Because of its sophistication, it is expected that this nano-manipulator will be difficult to manufacture and ultimately expensive.

SUMMARY OF THE INVENTION

This invention provides a low-cost means for the rigidly-stable positioning of objects with precision and resolution at the 10-nanometer level. A novel actuator design employs a flexure-beam element to achieve motion reduction, by a factor of 1/1000 or more in one embodiment, between the actuator's drive mechanism and output element. The output element moves exactly in the same direction as the input element. The magnitude of the output element's movement is linearly proportional to the magnitude of the input element's motion, and is readily calculable in a single equation from the geometry and material properties of the flexure-beam element. Undesirable perturbations at the drive mechanism are substantially decoupled from the output element, permitting the use of low-cost drive mechanisms. Good open-loop accuracy is obtained in the flexure-beam actuator by incorporating thermal-compensation into the output element. In one embodiment, the actuator permits user-adjustment of the motion-reduction ratio for greater versatility. The actuator can be cascaded readily, and manufactured from a single slab of material. The flexure-beam actuator is integrated into an aerostatic XYØpositioning stage for both linear and rotary motion control. The low-cost stage provides for precise, high-resolution motion and rigid position-locking for any object requiring nanometer-level motion control. Because of its low cost and high performance, this invention assists in making nanotechnology accessible to a broader scientific and technological community.

BRIEF DESCRIPTION OF THE DRAWINGS

FIG. 9b is a section view of the invention shown in FIG. 9a.

FIG. 10b is a section view portraying the guiding mechanism for the extended-range stage shown in FIG. 10a.

DETAILED DESCRIPTION OF THE INVENTION

It is known that flexure elements offer high precision, and can also be used to achieve motion reduction between an input drive mechanism and an output element. [*Precision Machine Design* by A. H. Slocum, Prentice-Hall, Inc., Englewood Cliffs, N.J., 1992.] It is also known that the moveable platform of an aerostatic (air bearing) stage offers negligible resistance to motion. [Ibid] It was also known in the early days of chronometers, that a material's thermal and flexure properties could be used to precisely maintain the length of a pendulum and provide highly accurate timepieces. [*Longitude*, Dava Sobel, Penguin Books USA Inc., 375 Hudson Street, New York, N.Y.] This invention combines the beneficial properties of a novel flexure actuator, thermal compensation, and aerostatic stages into a low-cost positioning stage suitable for rigidly-stable motion control at the 10-nm level. This detailed description is organized into three sections. Section I provides details of the flexure-beam actuator. Section II provides detailed descriptions of how the actuator is incorporated into aerostatic motion-control stages. Section III provides a detailed description of an electronic circuit used to operate the precision motion-control stages.

I.a. Basic Theory of the Flexure-Beam Actuator

Figure 6A:
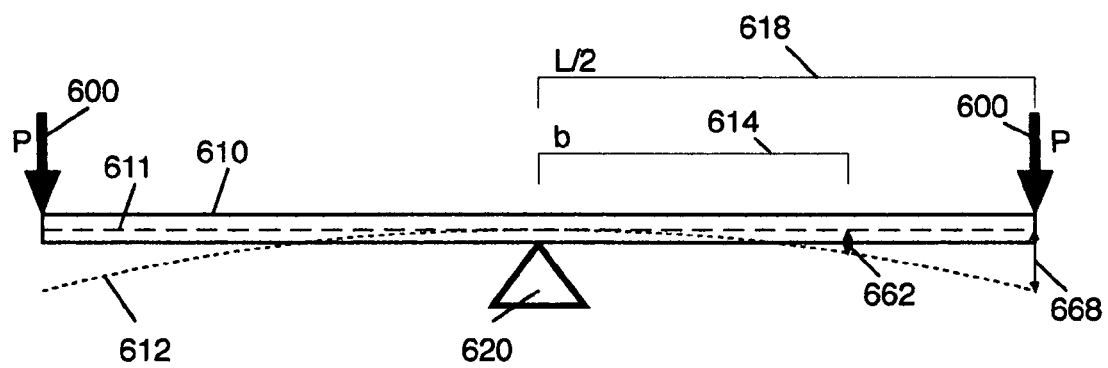
FIG. 6a is an elevation view of an overhanging flexure beam with a constant product of elastic modulus (E) and moment of inertia (I) along its length. The long-dashed line marks the neutral surface of the beam. The short-dashed line depicts the flexure action of the neutral surface when force is applied to each end of the beam.

FIG. 6a shows an elevational view of a flexure beam 610 balanced on a central support 620 and subject to a transverse force, P, 600 at each end. The beam's neutral plane is shown as a dashed line 611, and the beam has a constant depth, into the page, along its length. Problems of this type are well understood by those familiar with mechanics of materials. Because of the transverse forces, the beam moves and bends along its length, L. The exact shape of the deflection curve 612 that the neutral plane assumes can easily be calculated using several methods known to those experienced in mechanics of materials. The amount of movement 662 of the beam towards its center is substantially less than the amount of movement 668 at the beam's end in the direction of the applied force 600. For a beam of uniform cross section as shown, the motion-reduction ratio, $R_u$, defined as the amount of movement 662, a distance b 614 from the beam's center, divided by the amount of movement 668 at the beam's end, is found, using strain-energy and virtual-force methods, to be:

$$R_u = \frac{3}{2}\left(\frac{b}{L/2}\right)^2\left(1 - \frac{b}{3(L/2)}\right) \quad (1)$$

The second term in this equation shows the benefit of using a flexure beam to achieve motion reduction. The mechanical advantage of the lever arm, b/(L/2), that would be obtained if the beam were rigid and hinged at its center is squared for the flexure beam.

Figure 6B:
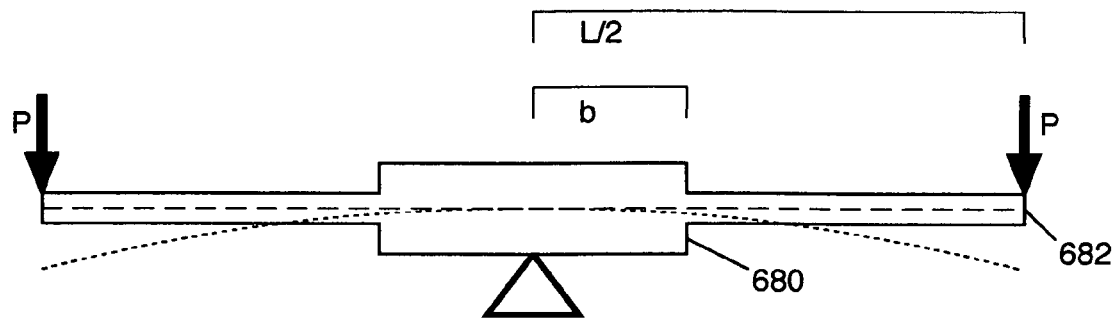
FIG. 6b is an elevation view of an overhanging flexure beam with a varying product of elastic modulus and moment of inertia along its length. For this beam, the EI product is stepwise continuous.

An improvement in motion reduction can be obtained by changing the beam's properties, in particular reducing the product of the beam's moment of inertia and modulus of elasticity I×E, towards the ends of the beam. The reduction in the IE product can be achieved by a variety of methods, changing the beam's cross section, drilling holes in the beam, changing its material composition or material properties. One example of such a beam is shown in the elevation view of FIG. 6*b*. For this stepwise continuous beam, its width 680 at the center is a factor of η times its width 682 at the ends. Its depth, into the page, remains unchanged. The reduction in width decreases the beam's moment of inertia at its ends. The motion-reduction ratio for this design is found to be:

$$R_{SC} = \frac{3}{2\eta}\left(\frac{b}{L/2}\right)^2 f_{SC} \quad (2)$$

where $0.68 < f_{sc} < 0.78$ due to practical considerations. The motion-reduction ratio has been improved by more than the factor η.

There are two improvements gained by reducing the flexure beam's moment of inertia at its outer ends. One improvement is the decrease in the motion-reduction ratio, as is evident by comparing EQN. 1 and EQN. 2. A decrease in the motion-reduction ratio increases the resolution and precision of any drive mechanism used to operate the flexure-beam actuator. The second improvement is in the reduction of stress in the outer fibers of the flexure beam. This reduction permits a larger deflection of the flexure beam, and corresponding range of motion, as compared to a uniform beam.

I.b. Embodiments of the Flexure-Beam Actuator

Figure 7A:
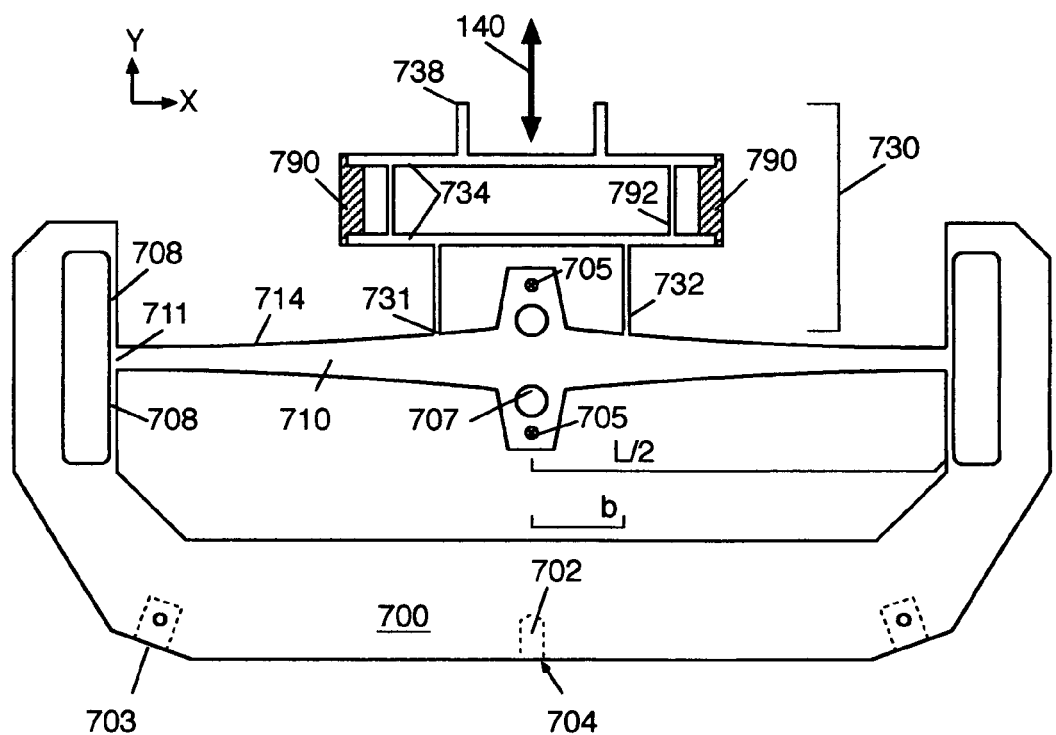
FIG. 7a is a plan view of a novel thermally-compensated, motion-reducing flexure-beam actuator of this invention. The actuator shown is comprised mainly of a rigid U-shaped input element, a main flexure beam, and a thermally-compensated, flexure-trusswork output element.

An exemplary embodiment of an actuator which utilizes the properties of a symmetrically tapered flexure beam is shown in the plan view of FIG. 7*a*. As shown, the flexure-beam actuator is comprised of only two materials. One material 790 is used for thermal compensation, while the remainder of the actuator can be fabricated from a single slab of material, metal or plastic. The actuator is anchored securely to a lower plate at two points 705, however the remainder of the actuator does not contact the lower plate and is free to flex, bend and move in the desired direction of motion 140.

The actuator operates in the following manner. A drive mechanism, not shown, acts upon a broad U-shaped input element 700 at its midpoint 704 causing it to move in the desired direction of motion 140. Means for connecting the drive mechanism to the input element may be a simple hole 702 drilled into the edge face of the input element. Outlying holes 703 provide a means to attach tension springs, which provide a countervailing force on the input element 700. This enables fore-and-aft flexing of the beam 710. The forward portions of the input element 700 are connected with flexure members 708 to the free ends 711 of the symmetrically tapered flexure beam 710. The flexure members 708 may be tapered in profile as shown, or have constant cross sections along their length. As the input element moves fore and aft in the desired direction 140, the tapered beam 710 bends and moves, or flexes, fore and aft. The flexure action leads to substantially reduced motion at the contact points 731 of the output element 730. The contact points 731 are located a distance b from the center of the tapered beam 710, and the end-to-end length of the center beam is L. For the embodiment shown, the profile 714 of the tapered beam is parabolic, i.e. its width is proportional to $(1+Cx^2)$ where x is the distance measured from the end 711 of the beam, and C is a design constant.

For the actuator of FIG. 7*a* having a parabolically tapered flexure beam, the motion-reduction ratio, defined as the magnitude of forward movement of the output actuator divided by the magnitude of forward movement by the input element is found to be approximately:

$$R_{pt} = \frac{\frac{\eta - (4b/L)}{\eta^2} + \frac{(2b/L) - 1}{1 + (\eta - 1)(1 - (2b/L))^2} + \frac{\arctan(sqrt(\eta - 1)) - \arctan\{(1 - (2b/L))(sqrt(\eta - 1))\}}{sqrt(\eta - 1)}}{\frac{\eta - 2}{\eta^2} + \frac{\arctan(sqrt(\eta - 1))}{sqrt(\eta - 1)}} \quad (3)$$

where η is the ratio of the beam's width at its center divided by the width at the outer end of the beam.

In the embodiment of FIG. 7*a*, the output element 730 is an integral part of the actuator, whereby it may be fabricated from the same slab of material. In an alternative, and more versatile embodiment, the output element is a separate component that attaches to the flexure beam 710 by any variety of means. In a preferred method, the output element's members 732 would be designed to snap over the top of the flexure beam 710 at predetermined locations. Detents or small holes along the main flexure beam may serve as registration points for the output elements. In this manner, several output elements, each having a different span length between the members 732, could be interchangeable for one actuator. The change of span length would change the value of b in EQN. 3, and therefore change the motion-reduction ratio. This would permit a user to quickly change the actuator's resolution, precision and range of motion control. A preferred embodiment for this user-adjustable actuator would be to provide several output elements corresponding to motion-reduction ratios of 1/5, 1/10, 1/20 and 1/50. Alternatively, the input element 700 could be designed to attach at various locations along the flexure beam 710.

As shown in FIG. 7*a*, two compensating, or tuning, holes 707 are drilled through the center region of the beam 710 to permit the beam to bend more freely in the center region, and minimize interference from the mounting points 705. Without the holes, the bending of the beam would be more accurately modeled as back-to-back cantilevered beams, and the expression for the motion-reduction ratio, EQN. 3, would be changed accordingly. This change would be clear to anyone skilled in the art of mechanics of materials. The addition of these holes permits fine tuning of the actuator's motion-reduction ratio after the complete structure has been fabricated. The size and location of the holes 707 determine the flexibility of the beam at its center. Therefore, to obtain a precise motion-reduction value, say 1/50, the size of the holes might be enlarged slightly or filled with a hard material, until the desired motion-reduction value is obtained.

Figure 7B:
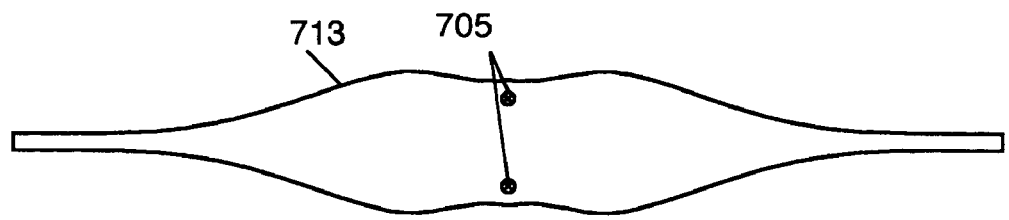
FIG. 7b is a plan view depicting an alternative embodiment of the main flexure beam for the actuator of this invention.
Figure 7C:
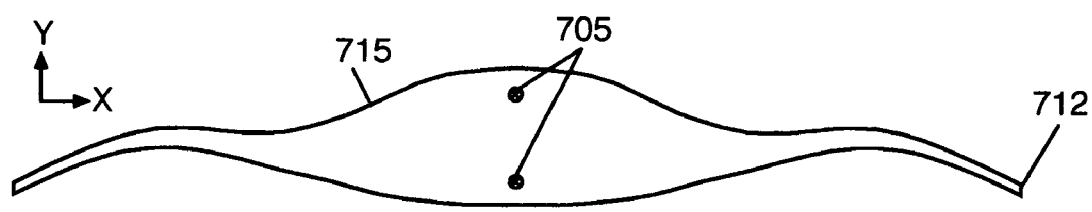
FIG. 7c is a plan view depicting an alternative embodiment of the main flexure beam for the actuator of this invention.

The profile 714 of the beam in FIG. 7a was chosen to be parabolic. It is within the spirit of this invention that the profile 714 can take any functional form, i.e. uniform, linear taper, stepwise uniform, and higher-order functional dependencies. The plan views of FIGS. 7b and 7c show other flexure-beam profiles 713 and 715 that would achieve similar results. The shape of FIG. 7c would be useful for forward-only motion, rather than a symmetric fore-and-aft flexing about the beam's neutral surface. The profile 715 offers an advantage in the forward motion of its tips 712. With the proper design, the position of the beam's tips 712 will remain at a constant position in X, as the beam flexes forward in Y. This alleviates any inward stress on the support members (708 of FIG. 7a).

Figure 7D:
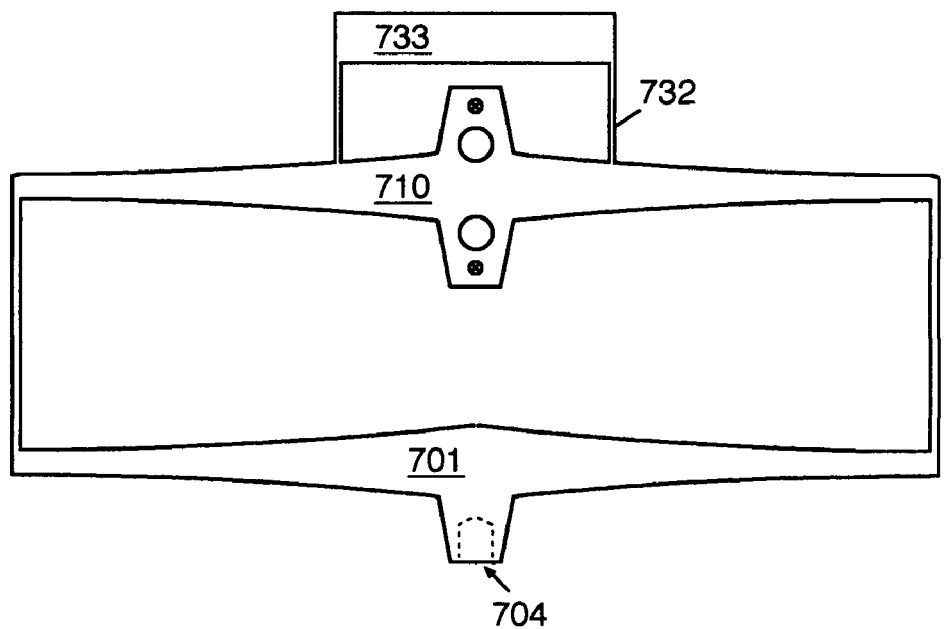
FIG. 7d is a plan view depicting an alternative embodiment of a motion-reducing flexure-beam actuator. Two flexure beams with varying EI product are used in this embodiment.
Figure 7E:
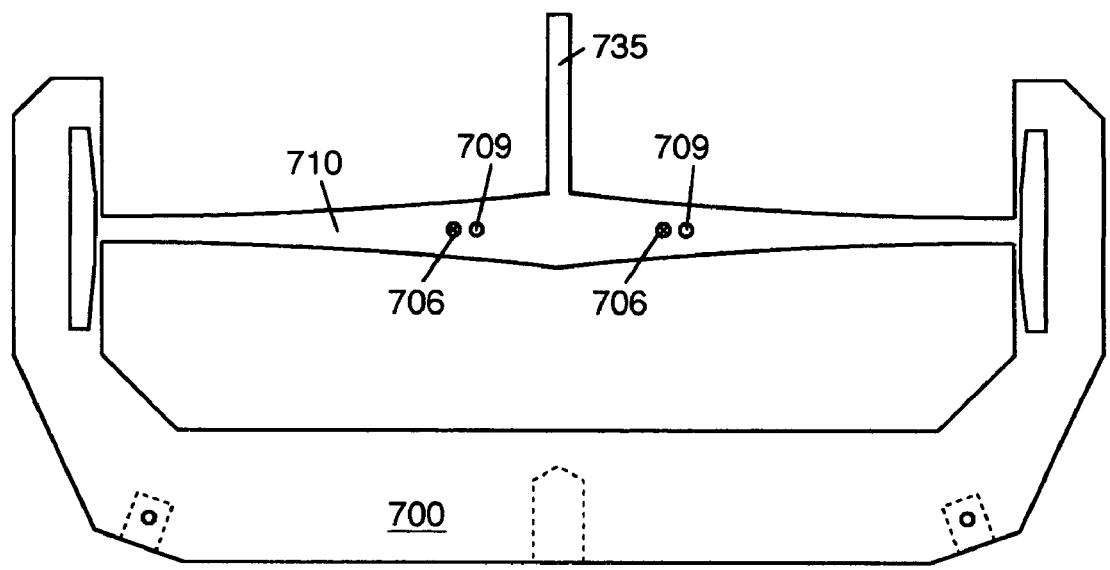
FIG. 7e is a plan view depicting an alternative embodiment of a motion-reducing flexure-beam actuator. For this embodiment, the output element moves in the opposite direction of the input element.
Figure 7F:
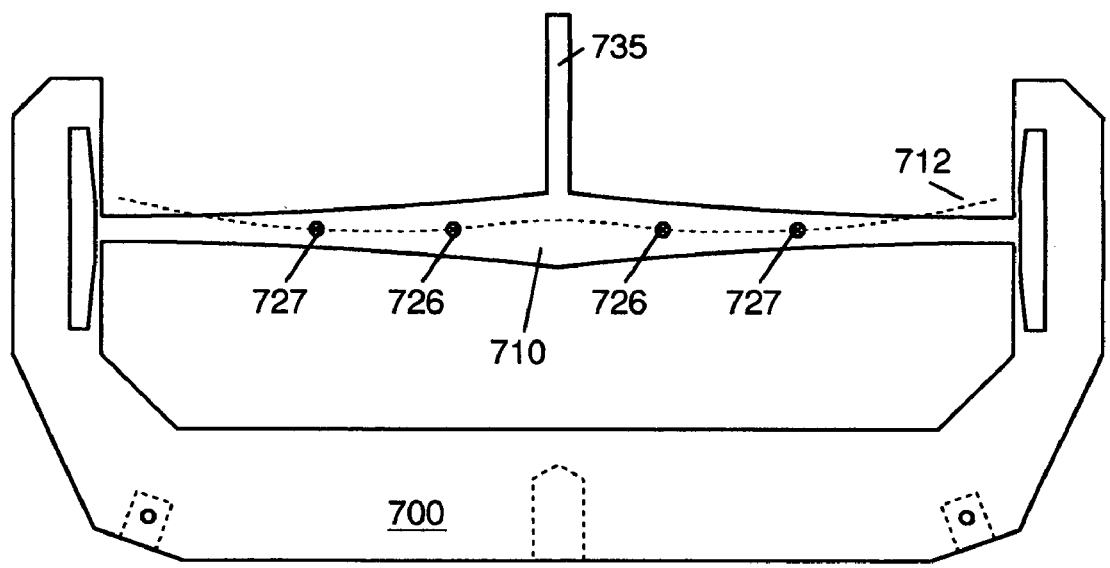
FIG. 7f is a plan view depicting an alternative embodiment of a motion-reducing flexure-beam actuator. For this embodiment, the main flexure beam is distorted into a high-order flexure mode.
Figure 7G:
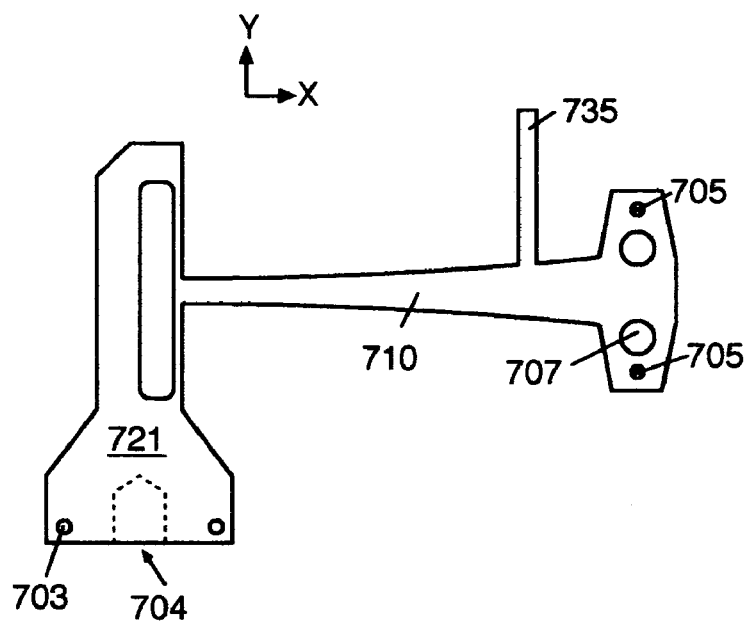
FIG. 7g is a plan view depicting an alternative embodiment of a motion-reducing flexure-beam actuator.

FIGS. 7d–7g show alternative embodiments of the actuator that are within the spirit of this invention. FIG. 7d shows an embodiment where the input element 701 is another symmetrically shaped flexure beam, with a provision 704 to connect to the drive mechanism. Since both the input element 701 and the main beam 710 flex, this embodiment provides for even greater motion reduction, or an equivalent reduction ratio for a smaller span width. An alternative output element 733 is shown for this design, which consists of a simple crossbar and two flexure members connecting to the main beam 710. FIG. 7e shows an embodiment from which either reverse motion, or rotary motion can be derived. In this embodiment, the main beam 710 is mounted semi-rigidly at two points 706 on either side of its center. The semirigid mounting permits bending of the beam, but not translation. To obtain reverse motion, an output element 735 is connected to the center of the beam 710. As the ends of the main beam are carried forward by the input element 700, the center of the beam moves in the opposite direction by an amount given by EQN. 3. In this embodiment, b is the distance from the beam's center to the mounting point 706. To obtain rotary motion for this embodiment, an output element (not shown) is connected to the two points 709. As the main beam 710 flexes forward, the left connection point 709 moves in a direction opposite to the motion of the input element 700, while the right connection point 709 moves in the same direction as the input element. Two small rods attached to the points 709 on the flexure beam and to an overlying platform (not shown) will induce fine rotary motion in the overlying platform. Another alternative embodiment, which produces greater motion reduction, is shown in FIG. 7f. For this embodiment, a total of four semirigid mounting points 726 and 727 are used. Again, these points permit bending of the beam, but not movement. A dashed curve 712 depicts the shape of the beam's neutral surface when flexed forward. The regions of the beam 710 between the points 726 and 727 deflect backward by a small amount while the center region between the two inner points 726 deflect forward by a small amount moving the output element 735 in the same direction as the input element 700. This embodiment can also be readily analyzed by one skilled in the art of mechanics of materials. Because a higher-order mode of flexion is excited in the beam, the motion reduction at the center of the beam can be made substantially smaller than for the embodiment shown in FIG. 7a or 7e. Another embodiment utilizes about one-half of the flexure-beam actuator, as shown in FIG. 7g. The input element 721 moves the free end of the flexure beam 710. The beam is rigidly anchored at the two points 705. A single bar output element 735 provides reduced motion as the beam flexes fore and aft. For this embodiment, the motion of the output element is not precisely in the same direction as the input element.

Figure 8A:
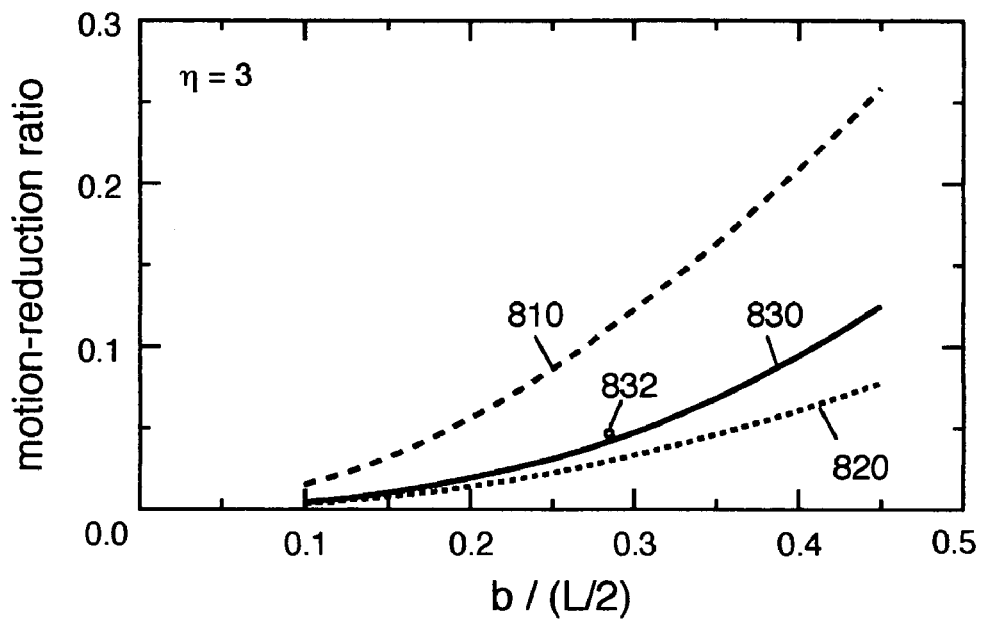
FIG. 8a is a graph of the flexure-beam actuator's motion-reduction ratio as a function of the design parameter $b/(L/2)$, and a constant value of $\eta=3$, for three flexure-beam designs. The long-dashed curve corresponds to a beam of constant EI product along its length. The solid curve corresponds to the beam design of this invention, and the short-dashed curve corresponds to a beam with a stepwise continuous EI product. The single data point represents the ratio measured from a prototype flexure-beam actuator designed according to the parameters used for the solid curve.

The motion-reduction ratio, also known as transmission ratio, for three flexure-beam actuator designs is plotted as a function of the ratio b/(L/2) in the graph of FIG. 8a. The ratio b/(L/2) can be understood by reference to FIGS. 6a, 6b and 7a. The curve 810 corresponds to a flexure beam with a constant EI product along its length, as depicted in FIG. 6a. This curve was generated from EQN. 1. The curve 820 corresponds to the stepwise-continuous flexure beam of FIG. 6b, and was generated from EQN. 2. The solid curve 830 corresponds to the flexure-beam actuator depicted in FIG. 7a, and was generated from EQN. 3. For both curves 820 and 830, $\eta=3$. The graph of FIG. 8a clearly shows the advantage of using flexure beams with non-constant EI product along their length for the purposes of motion reduction. At small values of b/(L/2) the improvement is more than a factor of three for the chosen designs.

I.c. Thermal Compensation of the Flexure-Beam Actuator

The actuator embodiment shown in the plan view of FIG. 7 contains a thermally-compensated output element 730. This output element is comprised of a trusswork of flexure members and two thermal compensating elements 790. The trusswork consists of two connecting members 732, which can flex in both horizontally (in the plane of the drawing) and vertically (out of the plane of the drawing). The members 732 connect directly to the flexure beam 710 at one end 731, and to one of two flexure crossbar members 734 of the output element 730. Two flexure thermal anchors 792 connect directly to and separate the crossbar members 734. Preferably, the connection point of members 732 to the crossbar 734 are inside the location of the thermal anchors 792 as shown in the drawing. Two output bars 738 are connected directly to the crossbar 734 at one end, and connect to any object, not shown, for which precise motion control is desired. The connection point of the output bars 738 to the crossbar 734 are also inside the location of the thermal anchors 792. The coefficient of thermal expansion (CTE) for the compensating elements 790 is greater than the CTE for the thermal anchors 792. The flexure members for the output element can be flexible bars of uniform cross section, or bars with notched flexure hinges.

The output element 730 compensates for thermal expansion in the following manner. As the entire actuator's temperature increases, all its components expand. This would tend to increase the distance between the drive mechanism's contact point 702 and the tip of the output element bars 738. However, the thermal compensating elements 790 expand more than the adjacent thermal anchors 792 causing an outward deflection of the end of the two crossbar members 734. This results in an inward deflection at the center of the crossbars 734, which reduces the distance, $D_o$, defined as the distance between the tip of the output element bars 738 and the connection point at the flexure beam 731. The reduction in $D_o$ can be used to offset any increase in distance between the actuator's drive mechanism, which contacts the input element at location 702, and the object under study, which is connected to the output element at location 738.

The magnitude of the length change of $D_o$, depends upon the geometry of the output element's trusswork, and the thermal properties of the trusswork and compensating materials. The magnitude of the length change, defined as $\Delta D_o$, is obtained after making several definitions relating to the design of the output element 730. The CTE of the compensating 790 material is defined as $\alpha_1$, and the CTE of the material used for the output element's trusswork is defined as $\alpha_2$. The equilibrium length of the thermal anchor 792 and compensating element 790 is $L_0$. The length of the members 732 is defined as $L_3$, and the length of the bars 738 is defined as $L_4$. The distance between the thermal anchor 792 and the compensating element 790 is defined as $d_1$. The distance between the thermal anchor and the member 732 is defined as $d_2$, and the distance between the thermal anchor and the bar 738 is defined as $d_3$. With these definitions, $$\Delta D_0 \approx \frac{\Delta T}{2}\left[\alpha_2\left(4+\frac{d_2+d_3}{d_1}\right)-\alpha_1\left(\frac{d_2+d_3}{d_1}\right)\right]+\Delta T\alpha_2 L_3+\Delta T\alpha_2 L_4 \quad (4)$$

where $\Delta T$ is the change in temperature from the equilibrium value. By choosing a material with a large coefficient of thermal expansion, $\alpha_1 > \alpha_2$, for the compensating element 790, the overall change in length $\Delta D_o$ of the output element can be made to be negative, as evident by EQN. 4. By choosing the correct lengths and distances, the negative length change can be made to compensate for any thermal expansion effects of the entire flexure-beam actuator, and instrument within which it is incorporated.

I.d. Reduction to Practice

A prototype actuator was fabricated from a single slab of extruded polystyrene (Foamular 250, manufactured by Dow Corning). The flexural modulus of the polystyrene, and its fracture point were measured experimentally. The modulus for the material was found to be $2.8 \times 10^3$ psi, and the fracture point occurred at a maximum strain of about 2.3%. The actuator was a scaled version of the design shown in FIG. 7a, although a thermally-compensated output element was not used. Instead, the output element 733 of FIG. 7d was used. The members 732 were located on the main beam 710 to provide a motion-reduction ratio of 1/24. This relatively high ratio was chosen due to limitations of position-measurement instrumentation. For this reduction ratio, the value of b/(L/2) was found to be 0.285. All position measurements were made using high-resolution digital imaging of high-contrast position-indicating marks located on the output element's crossbar, and an adjacent stationary reference mark. The position of the actuator's input element was determined by utilizing a calibrated lead screw, 32 threads per inch, as the drive mechanism.

The motion-reduction ratio for the prototype flexure-beam actuator was measured to be 1/21.4, and is plotted as a single data point 832 in FIG. 8a. The experimental result agrees well with the predicted performance for this design given by curve 830. The reduction ratio is slightly high due to an error in locating the output element's attachment members, 732 of FIG. 7a, along the main flexure beam, and also to reactive bending moments arising from the supporting members 708 at the end of the main flexure beam.

Tuning of the prototype actuator was carried out after fabrication by several methods. The reactive bending moments were relieved by notching into the ends 711 of the main flexure beam so as to provide flexural hinging at the ends. This reduced the reduction ratio to 1/22.4. The actuator was then tuned upwards by opening the tuning holes 707. This increased the reduction ratio to 1/20.2. The actuator was then tuned downwards by notching into the outer edges of the output element attachment members 732 at the point 731 where they attach to the main flexure beam. This had the effect of changing the span b, and decreased the reduction ratio to 1/22.7.

Figure 8B:
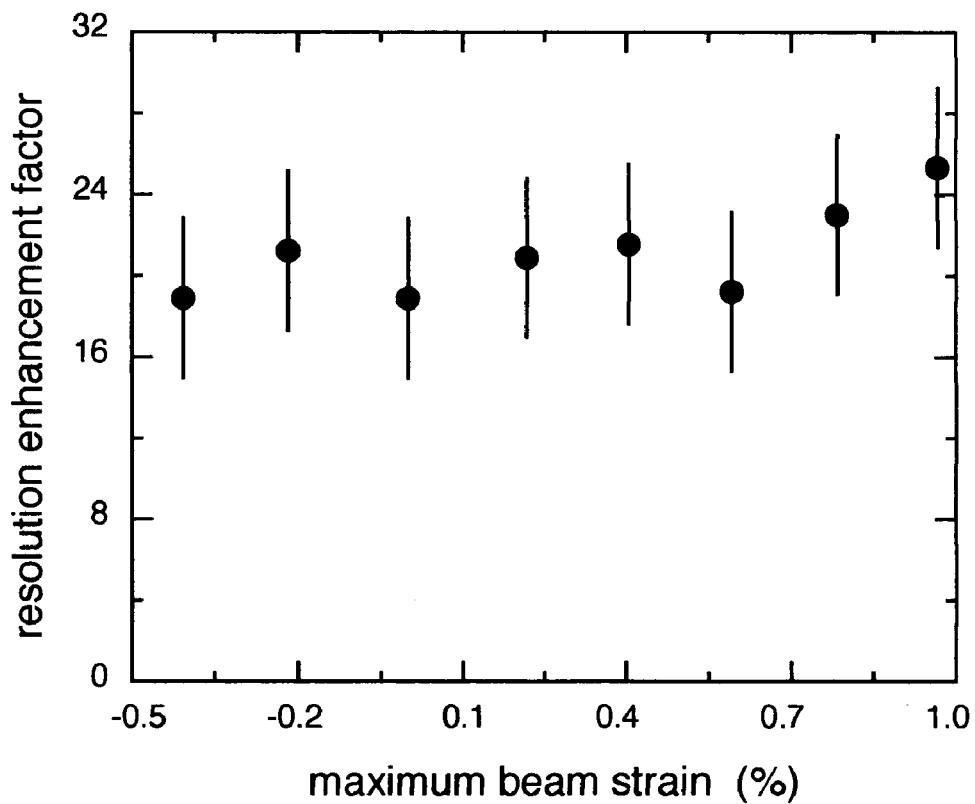
FIG. 8b is a graph of the motion-reduction ratio, measured from the prototype actuator, as a function of the actuator's range of motion.

FIG. 8b reports data from a measurement of the constancy of the resolution-enhancement factor, defined as $1/R_{pr}$, as a function of the maximum strain in the main flexure beam. The vertical bars indicate the measurement uncertainty, and negative values of strain correspond to negative deflections of the flexure-beam. This result shows that the reduction ratio remains constant, to within experimental uncertainty, for material strains on the order of 0.7%. The corresponding motion of the output element is substantially linear over the large range of deflection of the actuator's main flexure beam.

For the prototype actuator, the output elements linearity was excellent over a range of ±800 microns. The positioning resolution was about 800 nanometers. It was beyond the capability of the measurement instrumentation to determine the positioning precision.

I.e. Advantages Over the Prior Art

Figure 1:
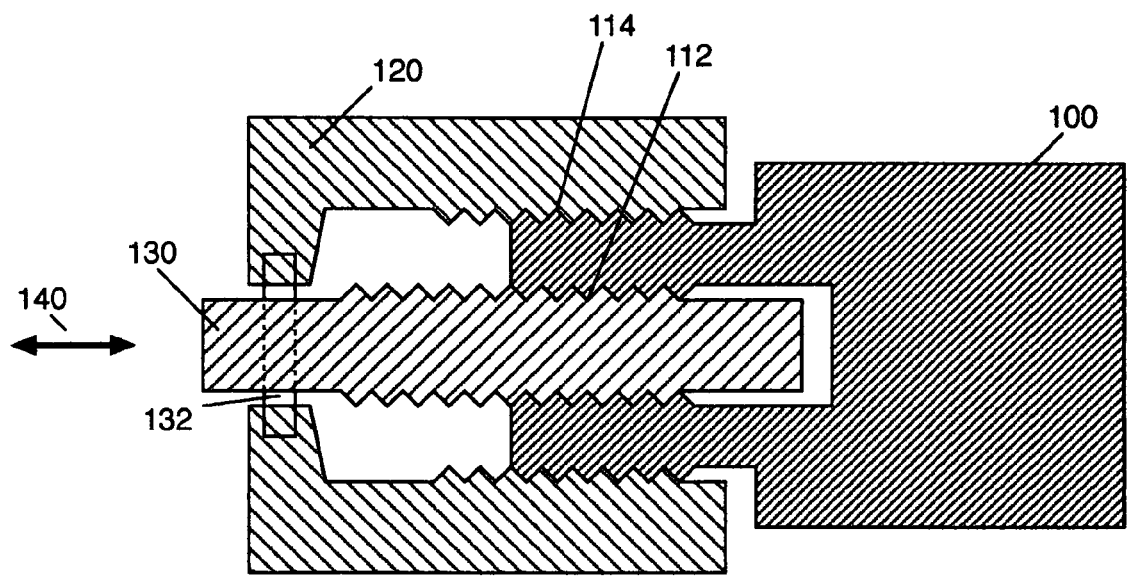
FIG. 1 is a section view of a differential micrometer, commonly used for high-resolution position of objects.
Figure 2:
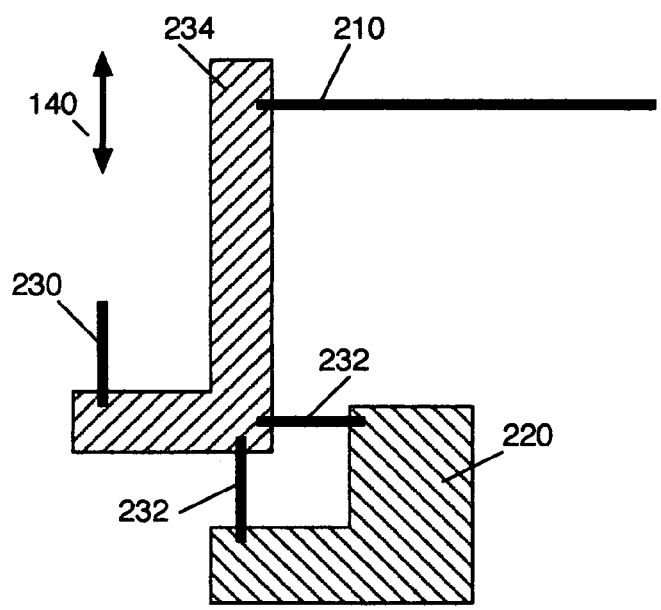
FIG. 2 is a plan view of a flexure-hinged, motion-reducing, lever-arm actuator useful for high-resolution positioning, as described in U.S. Pat. No. 4,209,233.
Figure 3:
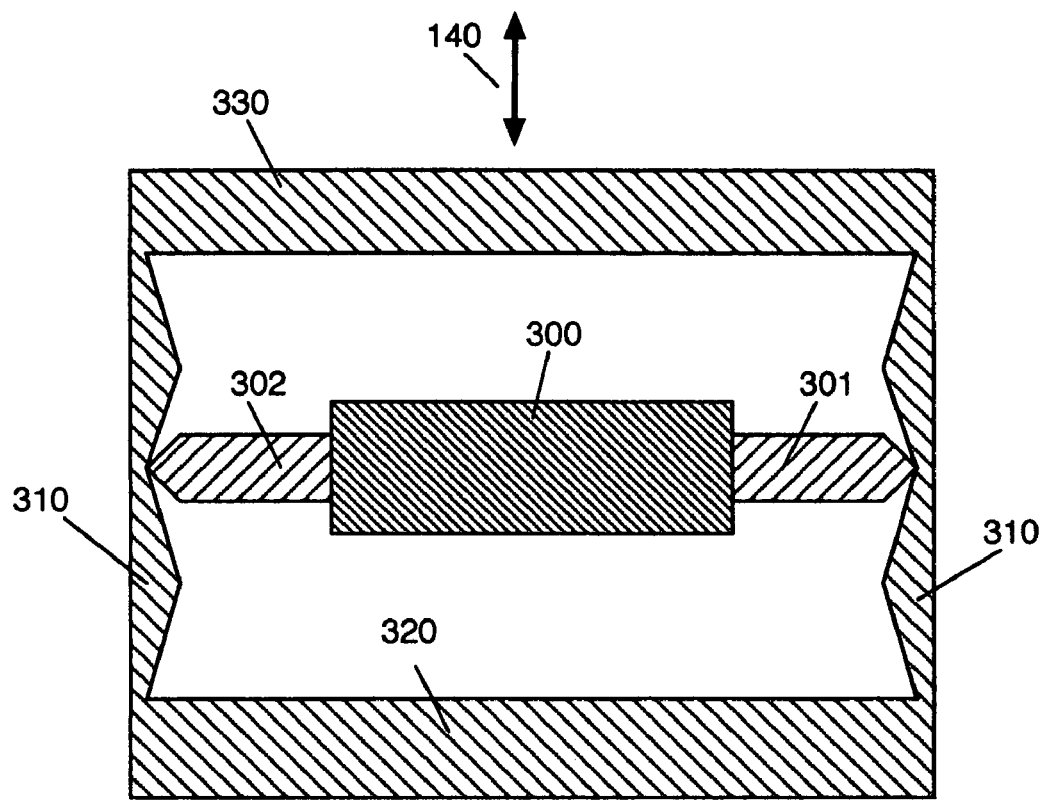
FIG. 3 is an elevation view of a motion-reducing flexure actuator, as described in U.S. Pat. No. 5,969,892, providing high-resolution, but nonlinear, motion in a direction perpendicular to its input motion.
Figure 4:
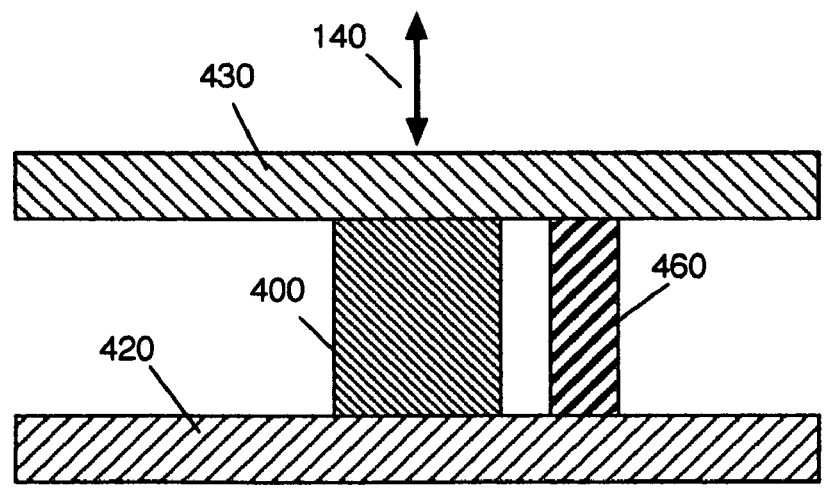
FIG. 4 is a plan view depicting an active electro-actuator used in state-of-the-art nanopositioning instruments.
Figure 5:
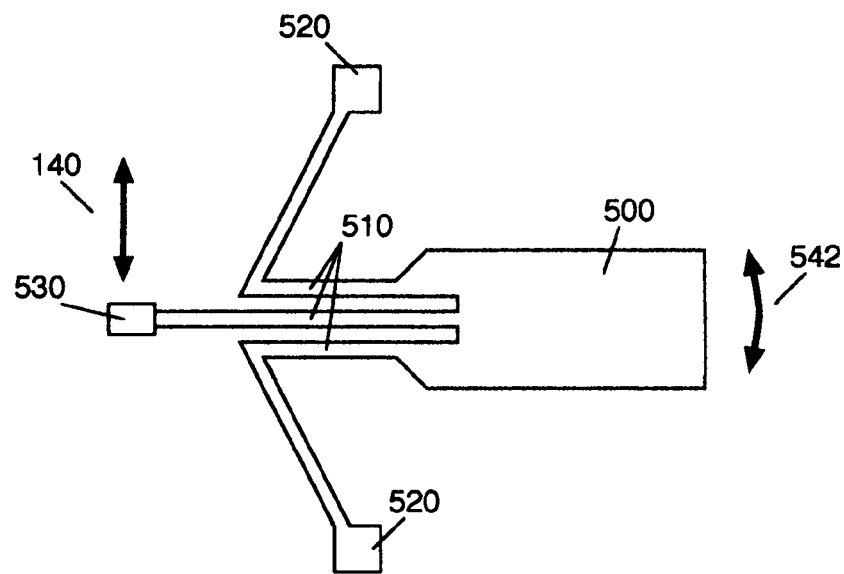
FIG. 5 is a plan view depicting a motion-reducing flexure actuator used in recently-disclosed six-axis nanopositioning invention.

There are clear and distinct advantages of this invention over the prior art, depicted in FIGS. 1–5. Because very low reduction ratios, <1/30, can be easily achieved with this invention and it is substantially free from deleterious effects of angular motion, its resolution and relative positioning accuracy are superior to the prior inventions depicted in FIGS. 1–3. The precision of this invention is also superior, because any unpredictable movements by its input element 700 are demagnified by the reduction ratio. Therefore both resolution and precision are improved by this invention's reduction ratio. The accuracy of this actuator is superior to that of the actuator's shown in FIGS. 4 and 5, because the PZT actuator (FIG. 4) suffers from nonlinear hysteresis, and the tri-forked flexure (FIG. 5) exhibits substantial angular motion. The position-sensing element 460 of FIG. 4 and associated electronics are not required for this invention. Trigonometric corrections required for the actuator of FIG. 5 are not required for this actuator. Because of its design, thermal compensation can be easily applied to this actuator, unlike the design of FIG. 5. The magnitude of motion reduction for this invention is easily calculable and easily tunable at the factory after manufacture, unlike the devices of FIGS. 3–5. Further, for an embodiment that incorporates interchangeable output elements, the motion reduction, resolution and precision can be changed easily by the user. Reduced motion for this invention is in precisely the same direction, or precisely opposite direction (FIG. 7e), unlike the actuator of FIG. 5.

Figure 7H:
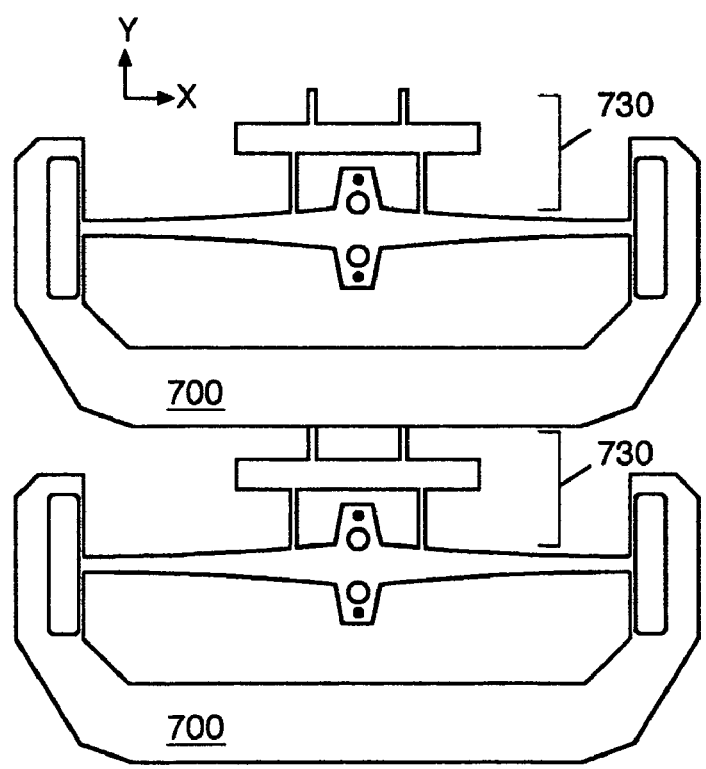
FIG. 7h is a plan view showing two cascaded flexure-beam actuators.

The actuator of this invention is easily cascaded, i.e. the output element 730 of one flexure-beam actuator can be connected to the input element of another identical actuator as depicted in FIG. 7h. When cascaded, the motion reduction ratio becomes $R^n$, where n is the number of cascaded actuators. For two cascaded actuators of R=1/50, the reduction ratio for the cascaded pair becomes 1/2500. For such an actuator pair, a common micrometer with a resolution of 10 um would achieve 4 nm resolution and sub-1-nm precision motion control. Cascading is not readily achieved for the design and implementation of FIG. 5.

Because of the actuator's design, thermal expansion effects that would normally cause positioning errors of the OUS are minimized. Any thermal expansion of the actuator's input element is demagnified by the motion-reduction ratio. Thermal expansion of the main flexure beam is primarily in a direction perpendicular to the desired direction of motion, and therefore has little effect on the position of the OUS. Since any remaining thermal effects can be cancelled with the compensating output element, most any material, including plastic, may be used to manufacture this invention. The use of plastic molding techniques would significantly reduce the cost of the device.

For this actuator design of this invention, the position of any OUS attached to the output element scales substantially linearly with the position of the actuator's input element. The scale factor is the motion-reduction ratio R. Because of this property, it is not necessary to sense or detect the exact position of the attached OUS. Instead, it is only necessary to detect the position of the actuator's input element to be able to determine the location of the OUS with high precision. This reduces the sensitivity requirements for any position-sensing apparatus used in conjunction with the actuator.

There are further advantages of this invention that become evident when it is incorporated into motion-control stages. These advantages are listed in Section II.c.

II.a A Single-Axis Aero-Flex Stage

For motion control at the nanometer level, non-bearing stages are preferred. The unpredictable action of rolling steel ball-bearings can cause substantial positioning errors. Flexure-bearing stages are useful, but are limited in several aspects. Their travel range must remain within the proportional limit of the flexure bearing, the semirigid flexure couplings between the stage's frame and movable body permits vibrational coupling to the moveable body, and the loading of a flexure-bearing stage is significantly limited. Heavy loads will damage the flexure bearings beyond repair. By combining the flexure-beam actuator of this invention with an aerostatic, hydrostatic, or electromagnetic stages, the benefits of nanometer motion control are retained while the limitations of flexure-bearing stages are overcome.

Figure 9A:
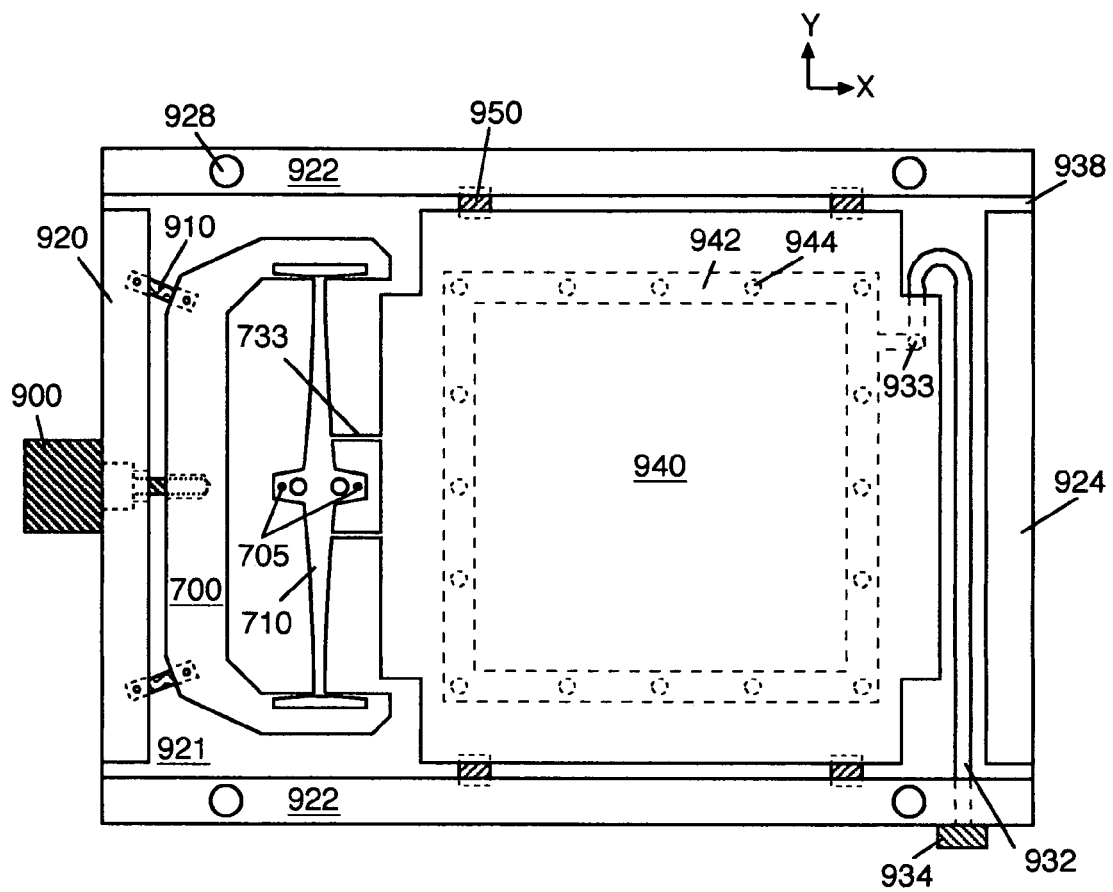
FIG. 9a is a plan view showing the inner working of a single-axis, aerostatic-bearing, flexure-beam actuated (aero-flex) positioning stage of this invention.
Figure 9B:
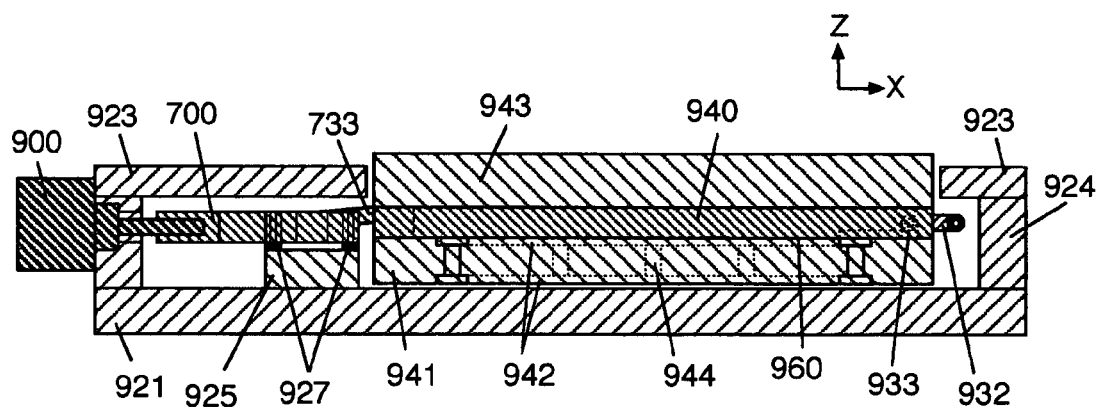

FIG. 9a is a plan view revealing the inner workings of a single-axis aerostatic stage, which incorporates the flexure-beam actuator of this invention. (The term aero-flex will be used as an abbreviated reference to the combined invention of the flexure-beam actuator and aerostatic stage.) A top cover plate for the stage is not shown in FIG. 9a. FIG. 9b represents a section view of the same embodiment. To simplify the drawing, the thermal-compensating output element 730 of FIG. 7a has been omitted. Instead, the simpler output configuration 733 of FIG. 7d is used, where the output members 732 connect directly to the stage's moveable platform 940. The entire stage is assembled on a lower plate 921 which is substantially flat. The surface of the lower plate 921 is electrically conductive underneath the movable platform 940. Four bars, 920, 922 and 924 comprise the outer walls of the stage's frame. Air gaps 938 permit exhaust of pressurized air. A cover plate 923 encloses the stage. Holes 928 pass through the cover, walls, and lower plate to permit stable mounting of the stage onto a flat surface. A drive mechanism 900 is mounted externally to the stage, and extends through one wall 920 to contact the flexure-beam actuator's input element 700. The drive mechanism could be one of several types: manual micrometer, differential micrometer, stepper motor, piezoelectric actuator, electro-magnetic actuator. The flexure-beam actuator is mounted securely using two holes 705, a lower stable block 925 and two thin standoff spacers 927. This mounting permits the beam to flex and bend in its center region. Two tension springs 910 provide counteracting force on the input element 700. These springs stabilize the input element, eliminate backlash in the drive mechanism and permit ±X flexure action of the main beam 710. The aero-flex stage's movable body 940 is comprised of three layers 940, 941, 943 and a thin-film nonconductive gasket 960 (not apparent in the drawing). The platform's upper layer 943 provides means for mounting any OUS. The platform's mid layer 940, provides means for direct connection with the actuator's output element 733, and an entry port for pressurized air 933. In the depicted embodiment, the flexure-beam actuator, output element 733 and platform mid layer 940 are machined or manufactured from the same slab of material. A soft, flexible tube 932 enters the stage through connection port 934 and inserts into the air port 933. This tube provides a means for applying pressurized air or vacuum to the platform's lower layer 941. The lower layer 941 has an electrically conductive lower surface, and channels 942 on its upper and lower surfaces. The upper channel distributes air to the holes 944 around the perimeter of the platform. These through-holes and lower channel provide a means to float the movable platform when pressure is applied to the air port 934, and also provide a means to lock the platform against the lower plate 921 when vacuum is applied to the port 934. When locked under vacuum pressure, the platform is rigidly stable. When floating on a film of air preferably 10 μm–50 μm thick, the platform can be precisely positioned with the actuator. To add stability to the platform, soft rubber or silicone plugs 950 contact the platform and outer walls 922.

For user convenience, simple external electronics are implemented to control the pressure at the air port 934, and indicate whether the platform is floating. Details of the circuit are presented in Section III. To avoid overstressing the actuator's output element 733 or main flexure beam 710, it is important that the platform be floating before the drive mechanism 900 moves the input element 700. For the purpose of determining whether the platform is floating, two electrical wires (not shown) connect with the stage. One wire makes electrical contact with the base plate 921, and a second wire contacts the platform's lower layer 941. The lower layer 941 is electrically isolated, due to the thin nonconducting film 960, from the upper portion of the platform. A simple external circuit tests for continuity between the two wires, and illuminates an LED warning light if continuity exists, i.e. platform is touching the lower stage plate 921. The warning light will indicate to the user that greater pneumatic pressure must be applied to the stage in order to float the platform.

The actuator can be designed and mounted so as to avoid overdeflection of the flexure beam 710 in the ±X directions. By mounting the actuator close to wall 920, the input element 700 will be stopped by the wall to prevent overdeflection in the −X direction. By designing the distance between the acuator's mounting region 705 and input element 700 carefully, the input element will be stopped by the beam's center region to prevent overdeflection in the +X direction.

The aero-flex stage may be operated in two manners. For both methods, the drive mechanism 900 acts upon the actuator's input element 700 to obtain high-resolution motion control. In one method, pneumatic pressure is applied so that the platform floats continuously during motion control. In the second method, a float-adjust-lock technique is employed. For this method, the platform only floats while critical motion-control adjustment are made. Then, vacuum is applied at the port 934 to securely lock the platform and OUS in place. Since the elevation, in the Z direction, of the floating platform is small, and the platform has X and Y flexure stabilizers, 733 and 950, the repeatability of the platform's position will be excellent after cycling through lock, float, and lock states. The repeatability can be improved by stiffening the stabilizers 950. The continuous-float manner of operation is useful for optical alignment, or scanning-probe applications. The float-lock method is useful for mask-to-substrate alignment in contact lithography where, in some cases, considerable forces are applied to the stage after precise alignment has been obtained.

There are other embodiments of the aero-flex stage that are within the spirit of this invention. In another embodiment, the stabilizers 950 are replaced with leaf-spring flexures, which would provide greater stability. In another embodiment, the stage could be suspended entirely by the leaf-spring flexures, a small distance above the base plate 921, and the application of vacuum would draw the platform 940 downward into a locked position. For this embodiment, the platform normally floats without the need for pressure at port 934. However, pressure could be applied for heavy loads on the platform. In another embodiment, air could be introduced through the lower plate 921. In another embodiment, sensors could be used to provide a digital readout of the exact location of the floating platform at all times. To enable motion control along both X and Y directions, a second flexure-beam actuator would be added to the stage depicted in FIG. 9a. The second actuator would attach to a perpendicular side of the platform 940. In another embodiment, the central region of the movable platform 940 and underlying plate 921 could be removed to permit a clear aperture through the stage.

Another embodiment of the aero-flex stage would enable automated position control. A computer, or similar electronics would control the drive mechanism 900. Before issuing a movement command, the central processor would command an electropneumatic valve to apply pressure at port 934. The processor then would verify that the platform 940 is floating, via the two float-sensing wires, before issuing the movement command. If a floating condition is not present, the processor issues a command to increase pressure at port 934. After floating and moving the platform, the processor relieves pressure and applies vacuum at port 934 to stably and rigidly lock the platform in place.

An embodiment of the aero-flex stage that permits user-adjustment of the motion-reduction ratio, would have an easily removable cover plate 923. This would allow the user to interchange the actuator's output element 733. For this embodiment, several output elements, similar to those shown in FIG. 7a or 7d, having different span lengths between the two connecting members 732 would be supplied with the stage. Each output element would provide a different reduction ratio. For greatest convenience, the output elements would snap into detents on the actuator's main beam 710, and fasten securely, via small screws, to the movable platform 940. The elements could also be secured to the main beam via small screws at the neutral surface of the beam, or via clamping. For this embodiment the movable body 940 could be comprised of only two layers, wherein the top layer also provides a means for securely attaching the actuator's output element.

Fabrication of the aero-flex stage is straightforward. As shown in FIGS. 9a and 9b, the single-axis aero-flex stage consists of five slabs of material (921, 923, 941, 940, 943), four bars (920, 922, 924), a small block 925, minor hardware components, and a drive mechanism. Precision machining is required only for the critical slab 940, which contains the flexure actuator. Care must also be taken to establish substantially flat surfaces between slabs 921 and 941. If made from metal or semiconductor materials, the components could be machined via standard precision milling, electro-discharge machining, or deep reactive-ion etching. Since thermal compensation can be implemented in the output element, and since the flexure actuator does not carry the weight of the platform and its load nor is subjected to substantial resisting forces, a rigid thermoform or thermoset plastic may be used for the flexure actuator and output element. For this realization, the actuator and various output elements, used for achieving adjustable motion reduction, could be fabricated using polymer molding, forming or casting techniques.

II.b. A Three-Axis Aero-Flex Stage

Figure 9C:
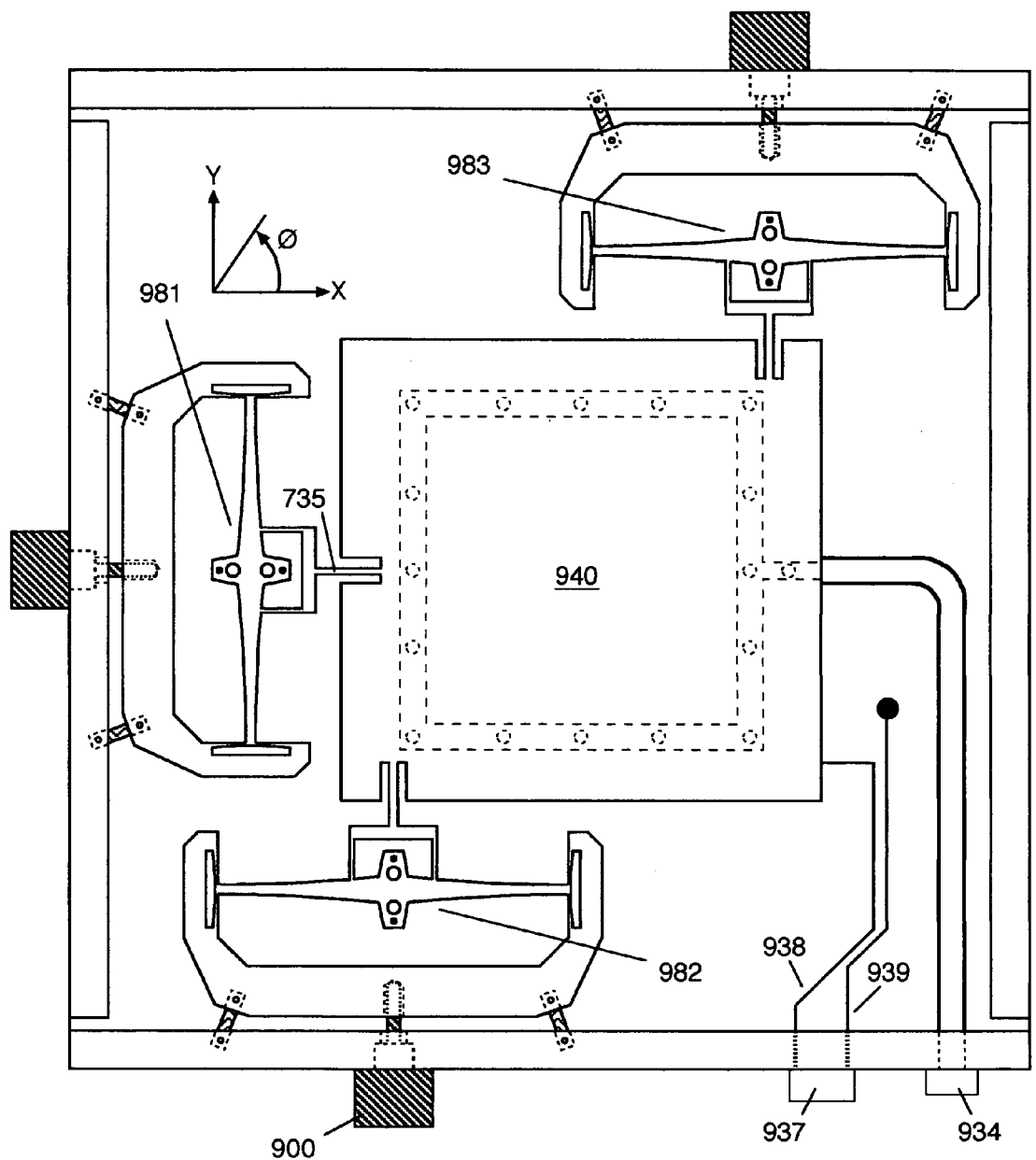
FIG. 9c is a plan view of a three-axis (XYØ) aero-flex stage of this invention.

The preferred embodiment of a three-axis (XYØ) high-resolution, high-precision positioning stage is shown in the plan view of FIG. 9c. For this embodiment, a total of three flexure-beam actuators 981, 982, 983 operate on the movable platform 940. Three drive mechanisms 900 control movement of each actuator's input element. One actuator 981 controls motion along the X direction. Two actuators 982 and 983, located on opposite sides of the platform, control motion along Y, and also control the rotation angle Ø of the platform. To permit platform rotation, the output elements from the actuators contact the platform via a single flexure bar 735. To increase their length, these bars intrude into the platform 940. A longer length of the bar 735 reduces cross-coupling between axial controls. Y-directed motion is achieved by actuator 982 pushing on the platform 940, and actuator 983 pulling on the platform, or visa-versa. Rotary motion is achieved by both actuators pushing, or pulling, on the platform 940. An electrical jack 937 is provided on the outer stage wall for connecting with the two float-sensing wires 938 and 939. A pneumatic port 934 is also provided on the outside wall of the stage. The stage operates in the same manner as described for the single-axis aero-flex stage, and is fabricated using any of the manners as described for the single-axis stage.

An example of the high performance that can be achieved with the three-axis aero-flex stage of FIG. 9c is determined as follows. An actuator design is chosen to give a motion-reduction ratio of 1/50. For this and $\eta=3$, the ratio of $b/(L/2)$ in EQN. 3 is about 1/4. The narrowest width of the flexure beam at its ends is designed to be 1.5 mm, and aluminum is used to fabricate the actuator. The drive mechanisms 900 are off-the-shelf, low-cost differential micrometers with a resolution of 500 nm and a precision of 200 nm. The perpendicular distance between the two Y actuators 982, 983 is designed to be 100 mm. The total length of the output element, from actuator's main beam to stage, is designed to be 30 mm. With these design parameters the resolution of motion control in X and Y directions is 10 nm, and the corresponding precision is 4 nm in X and 8 nm in Y. The resolution for rotary motion is 0.1 microradian (μr), and the corresponding precision is 0.08 μr. The range of motion for X and Y is about 100 μm. The range of rotary motion is 2 milliradians. The maximum cross-coupling of X-directed motion into Y-directed motion is zero at the platform's center (due to the symmetry of the Y actuators about this point). The cross-coupling of X-directed motion into Ø motion is less than 7 nanoradian ($10^{-9}$ radian) per 1 µm of X travel. The cross-coupling of Y-directed motion into X movement is less than 0.4 nm per 1 µm of Y travel. If plastic were used for the actuator, larger ranges for travel and rotary motion would be possible.

For user convenience, position-sensing instrumentation could be added to the aero-flex stage. This instrumentation would sense either the position of the moveable platform 940, or the position of each actuator's input element. The position-sensing apparatus could be comprised of any one or more of the following sensors: laser interferometry, capacitive sensors, atomic-force sensors, optical or magnetic sensors, digital imaging equipment, or electromagnetic or piezoelectric transducers. The function of the sensors and associated electronics would be to provide a digital readout of the platform's position and rotational orientation.

II.c. Advantages Over Prior Art

There are clear and distinct advantages of the three-axis aero-flex stage of this invention over conventional stages and a recently disclosed stage which uses the actuators of FIG. 5. Because of its flexure actuators, aerostatic operation, and capability for thermal compensation, the stage of this invention has superior resolution, precision and open-loop accuracy compared with conventional stages. Because it is comprised of few parts, the material and construction expenses for this stage are low. The aero-flex stage offers convenient user adjustment of resolution and precision, by use of interchangeable output elements, for a single drive mechanism. This is not currently possible with any commercially available stage. There are several advantages of this stage over flexure-bearing stages such as the recently disclosed, high-precision HexFlex invention which utilizes the actuator of FIG. 5. Since aerostatics are used for the aero-flex stage, the movable platform can carry loads of any weight or sustain any force, provided enough pressure is supplied to float the platform. This is not true for the HexFlex stage, where heavy loads or forces will damage the flexure actuators and flexure supports beyond repair. The aerostatics of this invention permit rigidly-stable locking of its moveable platform, without significant perturbations to the platform's XYØ position. No provision for platform locking or support is provided for the HexFlex invention. To achieve XYØ motion with this invention, one actuator is activated for X, two for Y and two for Ø. The amount of movement of the actuator's output element is exactly the same as the amount of movement of the moveable platform which holds the OUS. For the HexFlex design, two actuators are activated for X motion, three for Y and three for Ø. The amount of movement of that instrument's output element is at a substantial angle with respect to the desired direction of motion, so that its platform does not move by the exact same amount as the actuator's output element. Trigonometric compensation must be employed to determine the amount of movement of the HexFlex's moveable platform. The design of this invention permits easy interchange of common drive mechanisms, which are mounted external to the stage's main body. The HexFlex design requires the drive mechanism to be incorporated within the stage's main body, which prevents the use of many off-the-shelf drive mechanisms. A further problem with incorporating the drive mechanism inside the stage is that heat dissipated from automated drive elements must be managed. For the aero-flex invention, heat is dissipated outside and away from the critical stage components. It is expected that the overall performance of the aero-flex stage will be more versatile and superior than any currently available stage for high-precision XYØ motion-control applications at a significantly lower cost.

II.d. Extended-Range Operation

As described in Section II.c, the range of motion control for the aero-flex stage is on the order of 100 µm. The range of motion is limited by material fatigue considerations, and by axial cross-coupling position errors. In particular, the main flexure beam in the actuator cannot be stressed repeatedly to its yield point. Additionally, the actuator's output elements 733 contribute to cross-coupling errors when flexed sideways by the movable platform 940. The use of a plastic actuator will permit a greater range of motion for the platform, but cross-coupling errors will increase accordingly.

To extend the range of motion of the aero-flex stage beyond 250 µm, a lower aerostatic stage assembly is added. The resolution and precision of the lower stage need to be only sufficient enough to position any OUS within the range of the aero-flex stage. For example, if the lower stage positions an OUS to within 20 µm of an intended location, the aero-flex stage can accommodate the error and move the OUS to its final desired location. Therefore, the design of the lower extended-range stage will be simple, and its cost will be low. Any of a wide variety of long-range positioning and rotary stages could be used for the lower stages. The aero-flex stage would mount directly onto the lower stage assembly. In the preferred embodiment, the lower stages would have provisions for pneumatic locking of the movable platforms, similar to that used for the aero-flex stage. The platforms could be coarsely guided by sliding nylon or teflon bushings.

Figure 10A:
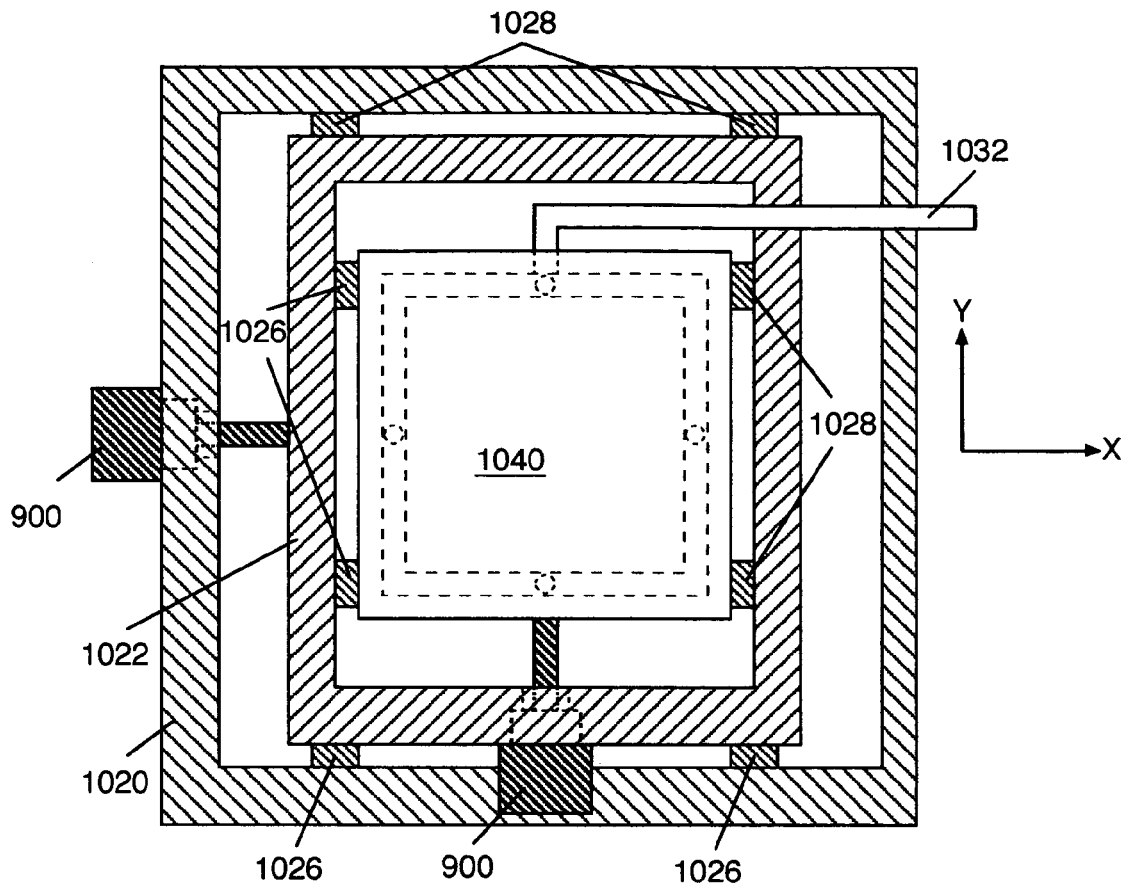
FIG. 10a is a plan view depicting an extended-range position stage that may be combined with the aero-flex stage.
Figure 10B:
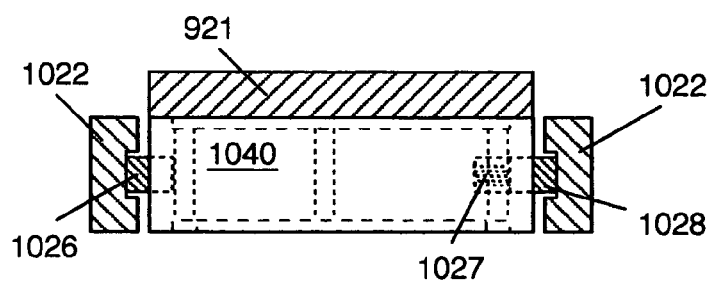

An exemplary embodiment of a lower XY stage for extended motion control is depicted in the plan view of FIG. 10*a* and section view of FIG. 10*b*. A movable platform 1040 is guided by an inner cage 1022, which in turn is guided by an outer frame 1020. Drive mechanisms 900 control the position of the inner cage and platform. Nylon or teflon pads 1026 and 1028 slide in tracks to provide guidance for the platform and inner cage. Two of the pads 1028 are acted upon by compressed springs 1027 to reduce wobble of the stage. A flexible tube 1032 provides a means for applying vacuum to pneumatically lock the movable platform 1040. The base plate 941 of the aero-flex stage mounts directly to the top of the platform 1040 as shown in FIG. 10*b*. A rotary stage would use the same guiding mechanism for a rotary platform.

Figure 10C:
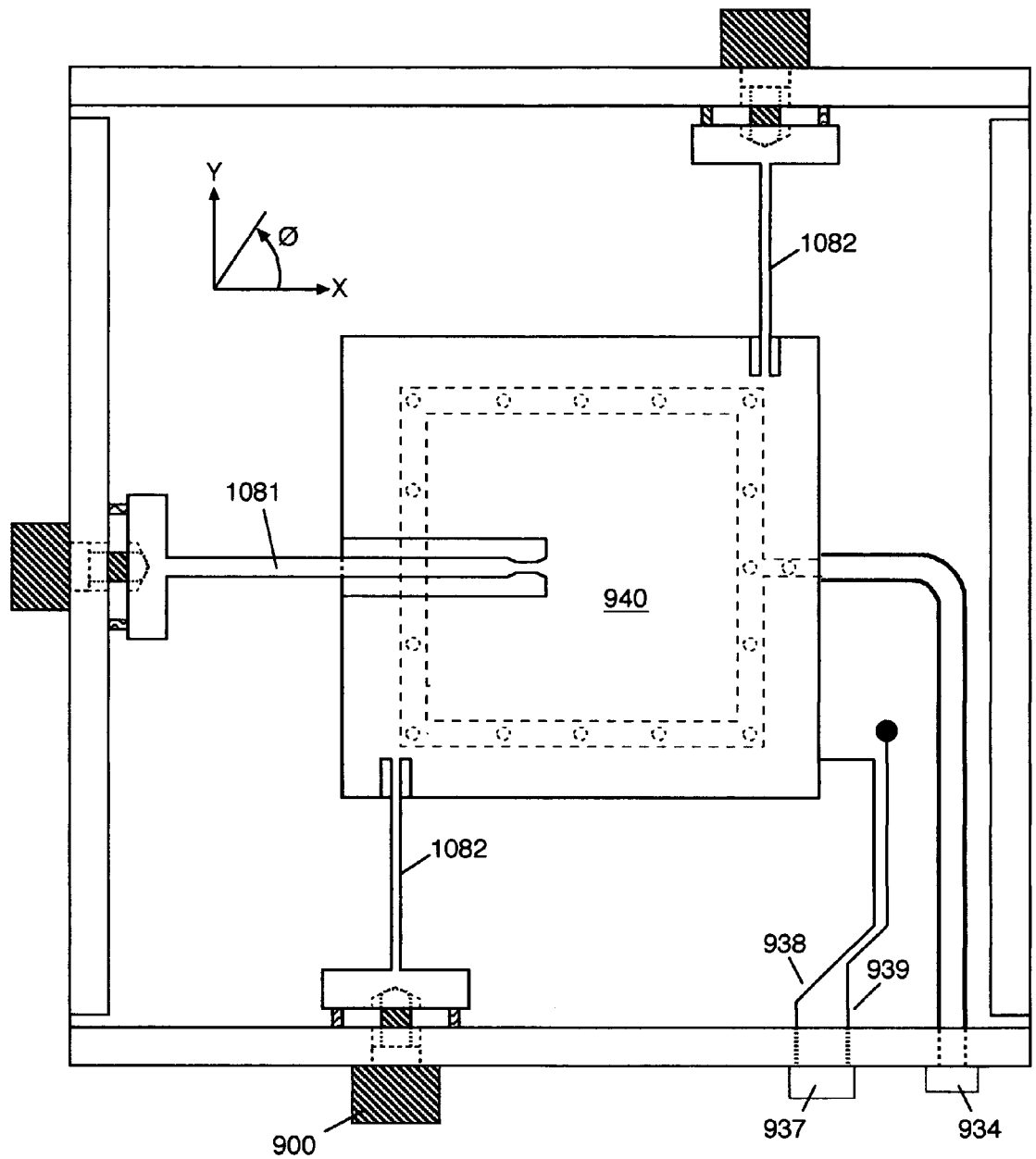
FIG. 10c is a plan view of a three-axis, aerostatic-bearing, extended-range stage that may be combined with the aero-flex stage of this invention to achieve precise motion control over distances of several millimeters and angles of several degrees.

For applications requiring total working distances of less than about ±4 mm, the extended-range stage depicted in the embodiment of FIG. 10*c* would be preferred. This stage is identical in all dimensions to the aero-flex stage. The only difference is that its flexure actuators 981, 982, 983 have been replaced with long plastic flexure bars 1081, and 1082. These bars provide a means for pushing and pulling on the movable platform 940. To minimize cross-coupling of rotary motion Ø into X-directed motion, the bar 1081 intrudes into platform 940 contacting a point as near the center of the platform as possible. (This approach could also be used for the aero-flex stage shown in FIG. 9*c*, and the Y bars could extend further into the platform. For bars that intrude into the platform 940, their thickness must be reduced slightly so they flex freely between the platform's upper and lower plates, 941 and 943 of FIG. 9*b*.) For the embodiment shown in FIG. 10*c*, and the dimensions listed in reference to the embodiment depicted in FIG. 9*c* of Section II.b, the extended range stage would be capable of ±4 mm movement in X and Y, and ±4.5° rotation in Ø. The corresponding resolution, using off-the-shelf micrometers for drive mechanisms 900, would be 10 µm for X and Y, and 0.2 milliradians for Ø. The cross-coupling of Y motion into X would be about 300 nm per 10 µm travel in X, and the cross-coupling of X motion into Y would be zero at the stage's center. The cross-coupling of X motion into Ø would be about 50 microradians per 10 µm travel in X. This extended range stage would be useful for many applications, since any OUS can be placed by hand within ±4 mm and ±4.5° of its desired location.

For high-precision, high-accuracy long-range motion, a stage with laser interferometry would be added to the combined stages. Such an instrument is well known to those skilled in the sciences of metrology and lithography. To incorporate a laser-interferometer stage, a precision right-angle mirror would be mounted on the platform 940 of the high-resolution aero-flex stage depicted in FIG. 9c. The interferometer would sense the exact position of the mirror to an accuracy of better than 5 nm in both X and Y directions.

III.a. Electro-Pneumatic Controls for the Aero-Flex Stage

Figure 11A:
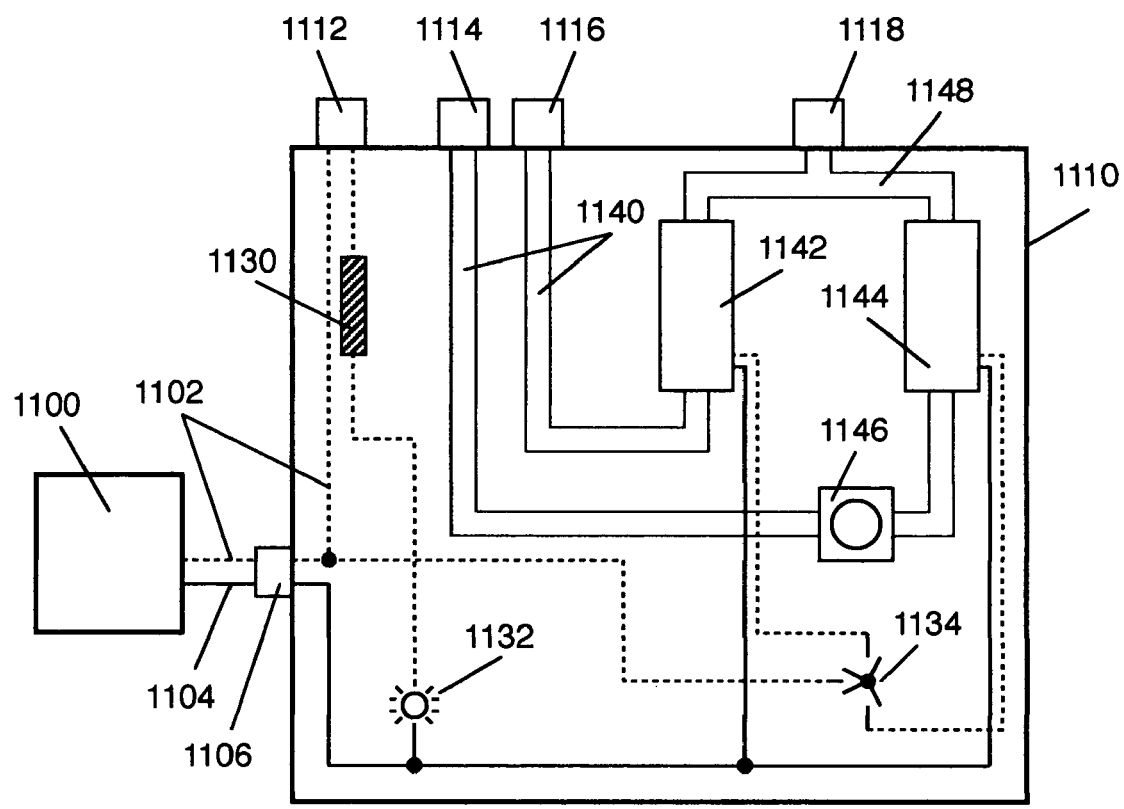
FIG. 11a is a circuit diagram depicting electro-pneumatic controls useful for operating the aero-flex stage of FIG. 9c or extended range stage of FIG. 10c.

There are three basic functions—float sensing, float activation, and vacuum lock—required for the aero-flex stage that are readily controlled with an electro-pneumatic circuit. The circuit may be external to the stage body, or for large stages, incorporated within the main framework of the stage. An exemplary electro-pneumatic circuit is shown in FIG. 11a. This circuit enables push-button operation of float activation and vacuum lock, and a visual warning indicator for float sensing.

The electro-pneumatic circuit operates as follows. An external power supply 1100, preferably a wall-mount power adapter, provides positive voltage on wire 1102, and ground potential on wire 1104. The chord from the supply plugs into the power jack 1106, thereby connecting with the circuit's internal wires. A branch from the positive-voltage wire exits the unit at connection port 1112. A two-wire chord connects this port to the aero-flex's float-sensing wires at the stage's port (937 of FIG. 9c). When the stage is not floating, continuity is established across the two wires at port 1112, and current flows through the resistor 1130 and light-emitting diode 1132. The diode serves as a warning indicator lamp. For the pneumatic portion of the circuit, pressure from an external supply is applied to one branch of internal tubing 1140 at connection port 1114, and vacuum is applied to the other branch at port 1116. An electro-pneumatic vacuum valve 1142 and pressure valve 1144 are used to admit vacuum or pressure to an output manifold 1148. A pressure regulator or needle valve 1146 controls the amount of pressure delivered to the manifold and output port 1118. The pneumatic port 1118 is connected with a single flexible tube to the stage's pneumatic port (934 of FIG. 9c). The action of the electro-pneumatic valves is controlled with a three-position rocker switch 113. When set in one position, the pressure valve activates and admits pressure to the manifold 1148, thereby floating the stage. The regulator 1146 is adjusted until the stage's platform floats. When set in its mid position, both valves are deactivated and the stage's platform (940, 941, 943) settles on the lower plate 921. When set in its final position, the vacuum valve activates and admits vacuum to the output manifold, thereby locking the stage's platform securely in place.

Figure 11B:
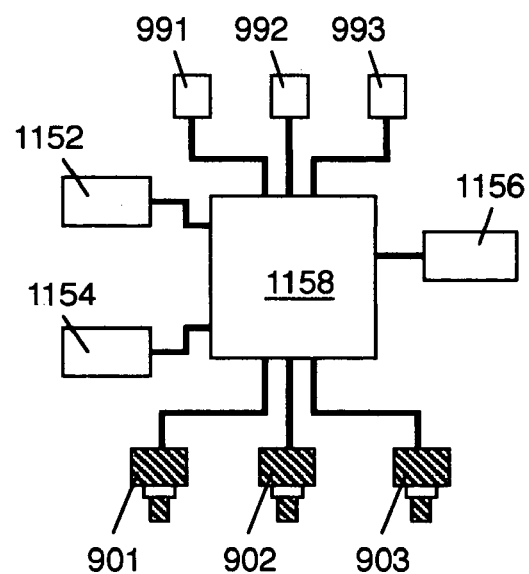
FIG. 11b is a block circuit diagram depicting the electronic control system for semi- for fully-automated operation of the aero-flex stage of FIG. 9c, or extended range stage of FIG. 10c.

For greater user convenience a second position-control circuit could be added to the stages depicted in FIGS. 9c and 10c. The position-control circuit would enable single-knob adjustment for each axis of motion, which would be an improvement over the need to adjust two knobs or drive mechanisms for Y and Ø movement. This circuit would also compensate for and eliminate the small cross-coupling effects within the stage. A block diagram of this circuit's function is shown in FIG. 11b. For this embodiment, electrically controlled stepper motors 901, 902, 903 are used as drive mechanisms. These motors provide a means for pushing or pulling on the input elements of the flexure actuators 981, 982, 983 of FIG. 9c, or bars 1081, 1082 of FIG. 10c. The platform's lock/unlock status is provided as a signal at 1152, and its float status is provided as a signal at 1154. In this embodiment, X motion-control commands are provided at 991, Y motion-control commands are provided at 992, and Ø motion-control commands are provided at 993. These commands could emanate from rotary potentiometer knobs, or computer generated commands. A central processing unit 1158 monitors the motion-control signals 991, 992, 993 and platform status signals 1152 and 1154. Once a motion-control command is received by the processor 1158, it tests for the float status at 1154. If the platform is not floating, an increase-pressure command is sent to the pressure-vacuum control port 1156. The processor also calculates movement commands for each of the drive mechanism 901–903. The commands are calculated in a manner such that any cross-coupling effects are cancelled. Once the platform is floating, the movement commands are issued to the motors 901–903. In this manner, the precision of motion along a single axis can be greatly improved, and motion-control can be more conveniently applied by the user.

Although the invention has been described above in terms of exemplary or preferred embodiments, it is clearly evident to one skilled in the art that modifications in form and detail may be made without departing from the spirit and scope of the invention.

What is claimed is:

1. A flexure-beam, motion-reducing actuator comprising
a flexible beam, which is affixed rigidly to a solid object near the midpoint of said beam, wherein said rigid affixment precludes lateral and vertical displacement and pivoting of said beam at the location of said affixment with respect to a stationary frame of reference, and wherein the remainder of said beam is substantially free to bend and move with respect to said stationary frame of reference;

further comprising an U-shaped input element which is substantially free to move with respect to said stationary frame of reference, wherein said U-shaped input element is connected to both ends of said flexible beam, and said connections of said input element to said beam ends are comprised of flexible material or flexural-hinged members, and said input element provides a means for connecting to a drive mechanism, wherein said drive mechanism moves said U-shaped input element in a controlled manner;

further comprising an output element which is substantially free to move with respect to said stationary frame of reference, wherein said output element is connected to two locations along said flexible beam, and said connections of said output element are comprised of flexible material or flexural-hinged members, and said output element also provides a means for connecting with any object for which controlled motion is desired;
wherein said connections of said output element are located on said flexible beam so as to provide substantial reduction of motion of said output element with respect to motion of said U-shaped input element, and further provide motion of said output element in substantially the same direction as motion of said U-shaped input element.

2. The flexure-beam actuator as claimed in claim 1 wherein said actuator is incorporated into an instrument so as to provide precise, high-resolution positioning, orientation or motion control of any object.

3. The flexure-beam actuator as claimed in claim 1 wherein said actuator is fabricated from a single slab of metal or plastic or from a combination thereof.

4. The actuator as claimed in claim 1 wherein the product of the modulus of elasticity and moment of inertia for said flexure beam may vary, be constant or a combination thereof along the length of said beam.

5. The actuator as claimed in claim 4 wherein said flexure beam is symmetrically shaped about the center point of said beam, with respect to said beam's long axis, and said product is also symmetrically varying about said center point.

6. The flexure-beam actuator as claimed in claim 5 wherein said actuator is incorporated into an instrument so as to provide precise, high-resolution positioning, orientation or motion control of any object.

7. The flexure-beam actuator as claimed in claim 5 wherein said actuator is fabricated from a single slab of metal or plastic or from a combination thereof.

8. A first flexure-beam actuator, as claimed in claim 7, including a second flexure-beam actuator, as claimed in claim 7, where the output element of said first actuator connects to the U-shaped input element of said second actuator.

9. The flexure-beam actuator as claimed in claim 5 wherein said output element is detachable from said flexure beam, and said flexure beam has provisions for attaching alternate output elements,
   where said alternate output elements attach at alternative locations along said flexure beam so as to change the amount of motion reduction between said U-shaped input element and said output element of said actuator.

10. The flexure-beam actuator as claimed in claim 9 where said detachable output element is a thermally-compensating output element,
   said thermally-compensating element being comprised of a trusswork of flexible members or flexural-hinged members where
   one or more flexible members provides a connection between said flexure beam and one of two parallel flexible members in said trusswork, and
   one or more flexible members provides a connection between a second of said parallel flexible members in said trusswork and an object for which precise motion control is desired, and
   said parallel flexible members are separated by three or more flexible, thermal-control members, wherein two or more of said thermal-control members have different coefficients of thermal expansion, and
   said thermal-control members, said connections to said flexure beam, and said connections to said object are located along said parallel members so as to cause a decrease in the distance between said flexure beam and said object when the temperature of said thermally-compensating output element is increased, such that
   said decrease in distance cancels any undesirable thermal expansion that would affect the precise location of said object.

11. The actuator as claimed in claim 1 where said output element is a thermally-compensating output element,
   said thermally-compensating element being comprised of a trusswork of flexible members or flexural-hinged members where
   one or more flexible members provides a connection between said flexure beam and one of two parallel flexible members in said trusswork, and
   one or more flexible members provides a connection between a second of said parallel flexible members in said trusswork and an object for which precise motion control is desired, and
   said parallel flexible members are separated by three or more flexible, thermal-control members, wherein two or more of said thermal-control members have different coefficients of thermal expansion, and
   said thermal-control members, said connections to said flexure beam, and said connections to said object are located along said parallel members so as to cause a decrease in the distance between said flexure beam and said object when the temperature of said thermally-compensating output element is increased, such that
   said decrease in distance cancels any undesirable thermal expansion that would affect the precise location of said object.

12. The flexure-beam actuator as claimed in claim 1 where said U-shaped input element includes a flexible beam, or said output element includes a flexible beam, or both said input and said output elements include flexible beams.

13. A method of adjusting the amount of motion reduction provided by the actuator as claimed in claim 1, said method comprising
   the drilling of holes in said flexure beam of said actuator, or
   the notching of the outer edge of said output element's connecting members, where said notches are at the location where said members connect with said flexure beam, or
   a combination of said drilling of holes and said notching.

14. The flexure-beam actuator as claimed in claim 1 combined with a high-resolution motion-control stage, said stage comprised of a solid base plate upon which are mounted one, two or three said actuators, corresponding drive mechanisms for each of said actuators, and a single moveable platform,
   wherein the incorporation of only one actuator provides for one-axis motion control, the incorporation of two actuators provides for two-axis motion control, and the incorporation of three actuators provides for three-axis motion control, and wherein
   said output element of each said actuator is connected to said moveable platform, and
   said drive mechanisms act upon said input elements of said actuators in a controlled and measurable manner,
   and said platform is further held with respect to said solid base plate by means of aerostatic bearings, flexure bearings, or a combination of aerostatic bearings and flexure bearings.

15. The high-resolution motion-control stage as claimed in claim 14 including means for limiting the range of motion of each input element,
   wherein said means is accomplished by incorporating within said stage's body solid material bumpers, posts, or limit switches.

16. The high-resolution motion-control stage as claimed in claim 14 including means for locking the position of said moveable platform, wherein said locking action is accomplished by the application of pneumatic vacuum between said moveable platform and said base plate of said stage.

17. The motion-control stage as claimed in claim 16 mounted upon an extended-range positioning stage providing for precise motion control over ranges less than 12 mm and less than 10 degrees, said extended-range stage comprising

- a solid base plate upon which are mounted one, two or three drive mechanisms and a single moveable platform,
- wherein the incorporation of only one drive mechanism provides for one-axis motion control, the incorporation of two drive mechanisms provides for two-axis motion control, and the incorporation of three drive mechanisms provides for three-axis motion control, and wherein
- each said drive mechanism of said extended-range stage is connected to said moveable platform of said extended-range stage so as to produce controlled and measurable movement of said platform, and
- each said connection between said drive mechanism and said platform is comprised of a long flexible member, and
- said platform of said extended-range stage is further held with respect to said solid base plate of said extended-range stage by means of aerostatic bearings or electromagnetic bearings, and
- a means is provided for locking the position of said moveable platform of said extended-range stage, wherein said locking action is accomplished by the application of pneumatic vacuum or electromagnetic force between said moveable platform and said base plate of said extended-range stage.

18. A motion-control stage as claimed in claim 17 combined with laser interferometry, wherein said laser interferometry provides a means for detecting precisely the position, with reference to one, two or three axes of motion, of said moveable platform of said high-resolution stage.

19. The motion-control stage as claimed in claim 17 including an electro-pneumatic control circuit combined with said stage, said circuit comprising

- an electrical-continuity sensing circuit providing an electrical, audio or visual indication when electrical continuity is present on said sensing circuit, wherein said continuity is established when said movable platform is in contact with said base plate of said stage, and
- one or more electrically-actuated pneumatic valves, providing means for the application of pneumatic pressure or vacuum to said moveable platform of said stage, and
- a pressure adjusting mechanism, which controls the amount of pressure applied to said moveable platform, and
- a power supply, mounted either internally or externally, providing electrical voltage and current to said electro-pneumatic control circuit.

20. The motion-control stage as claimed in claim 16 including an electro-pneumatic control circuit combined with said stage, said circuit comprising

- an electrical-continuity sensing circuit providing an electrical, audio or visual indication when electrical continuity is present on said sensing circuit, wherein said continuity is established when said movable platform is in contact with said base plate of said stage, and
- one or more electrically-actuated pneumatic valves, providing means for the application of pneumatic pressure or vacuum to said moveable platform of said stage, and
- a pressure adjusting mechanism, which controls the amount of pressure applied to said moveable platform, and
- a power supply, mounted either internally or externally, providing electrical voltage and current to said electro-pneumatic control circuit.

21. The motion-control stage as claimed in claim 14 wherein the drive mechanisms are calibrated micrometers, differential micrometers, piezoelectric actuators, lead screws, or electrically controlled stepping motors.

22. A flexure-beam, motion-reducing actuator as claimed in claim 1 wherein

- said input element includes a motion actuator which moves said ends of flexible beam in a controlled manner.

* * * * *